(12) United States Patent
Li et al.

(10) Patent No.: US 11,579,759 B1
(45) Date of Patent: Feb. 14, 2023

(54) SYSTEMS AND METHODS FOR SECURITY DATA ANALYSIS AND DISPLAY

(71) Applicant: Knightscope, Inc., Mountain View, CA (US)

(72) Inventors: William Santana Li, Mountain View, CA (US); Stacy Dean Stephens, Grand Prairie, TX (US); Mercedes Soria-Li, Mountain View, CA (US); Aaron J. Lehnhardt, Mission Viejo, CA (US); Dominic A. Villa, San Jose, CA (US); Phillip Wong, San Francisco, CA (US); Arne Stoschek, Palo Alto, CA (US)

(73) Assignee: KNIGHTSCOPE, INC., Mountain View, CA (US)

( * ) Notice: Subject to any disclaimer, the term of this patent is extended or adjusted under 35 U.S.C. 154(b) by 0 days.

(21) Appl. No.: 16/688,960

(22) Filed: Nov. 19, 2019

Related U.S. Application Data

(63) Continuation of application No. 15/695,861, filed on Sep. 5, 2017, now Pat. No. 10,514,837, which is a
(Continued)

(51) Int. Cl.
*G06F 3/04847* (2022.01)
*G06F 16/29* (2019.01)
(Continued)

(52) U.S. Cl.
CPC ........ *G06F 3/04847* (2013.01); *G06F 3/0482* (2013.01); *G06F 16/29* (2019.01); *G08B 13/22* (2013.01)

(58) Field of Classification Search
CPC ...... G06F 16/29; G06F 21/554; G06F 21/577; G06F 21/6218; G06F 2221/031;
(Continued)

(56) References Cited

U.S. PATENT DOCUMENTS

| | | | | |
|---|---|---|---|---|
| 5,446,445 | A | * | 8/1995 | Bloomfield ............ G08B 25/10 340/521 |
| 6,085,090 | A | * | 7/2000 | Yee ........................ G01S 5/0027 342/450 |

(Continued)

FOREIGN PATENT DOCUMENTS

KR          100835085 B1      6/2008

OTHER PUBLICATIONS

Search Query Report from IP.com (performed Aug. 13, 2021) (Year: 2021).*

(Continued)

*Primary Examiner* — Sharon S Lynch
(74) *Attorney, Agent, or Firm* — Wilson Sonsini Goodrich & Rosati

(57) ABSTRACT

Systems and methods are provided for improved security services. In one aspect, a method is provided for controlling an autonomous data machine situated near a monitored environment. The method comprises: obtaining security data from a plurality of data sources; analyzing the security data to generate an analysis result; determining, based on the analysis result, an action to be performed by the autonomous data machine; and transmitting a command to the autonomous data machine causing it to perform the action.

10 Claims, 25 Drawing Sheets

Related U.S. Application Data continuation-in-part of application No. 14/751,124, filed on Jun. 25, 2015, now Pat. No. 9,792,434, which is a continuation of application No. 14/599,344, filed on Jan. 16, 2015, now abandoned.

(60) Provisional application No. 61/929,003, filed on Jan. 17, 2014.

(51) Int. Cl.
*G06F 3/0482* (2013.01)
*G08B 13/22* (2006.01)

(58) Field of Classification Search
CPC ....... G06F 2221/034; G06F 2221/2141; G06F 3/0481; G06F 3/0482; G06F 3/04847; G08B 13/19682; G08B 13/22
See application file for complete search history.

(56) References Cited

U.S. PATENT DOCUMENTS

| | | | | |
|---|---|---|---|---|
| 6,154,771 | A * | 11/2000 | Rangan | H04N 21/8193 709/217 |
| 6,343,242 | B1 * | 1/2002 | Nomura | B25J 9/1676 700/245 |
| 6,374,155 | B1 | 4/2002 | Wallach et al. | |
| 6,429,617 | B1 | 8/2002 | Sano et al. | |
| 6,535,793 | B2 * | 3/2003 | Allard | B25J 9/1689 318/628 |
| 7,030,757 | B2 * | 4/2006 | Matsuhira | G08B 13/19645 340/521 |
| 7,885,912 | B1 * | 2/2011 | Stoneman | G06N 20/00 706/46 |
| 8,111,156 | B2 * | 2/2012 | Song | G08B 25/009 340/541 |
| 8,190,543 | B2 | 5/2012 | Kaushal et al. | |
| 8,473,143 | B2 * | 6/2013 | Stark | G07C 5/0891 701/28 |
| 8,676,273 | B1 * | 3/2014 | Fujisaki | H04M 3/533 455/567 |
| 8,744,626 | B2 * | 6/2014 | Johnson | G05D 1/0274 700/250 |
| 9,002,944 | B2 * | 4/2015 | Lewis | G07C 9/22 709/204 |
| 9,015,093 | B1 | 4/2015 | Commons | |
| 9,071,367 | B2 * | 6/2015 | Abhyanker | G06Q 50/01 |
| 9,079,311 | B2 * | 7/2015 | Wang | B25J 9/1664 |
| 9,329,597 | B2 | 5/2016 | Stoschek et al. | |
| 9,397,904 | B2 * | 7/2016 | Berlingerio | G06F 16/951 |
| 9,436,186 | B2 | 9/2016 | Oh et al. | |
| 9,595,072 | B2 * | 3/2017 | Fan | H04W 64/003 |
| 9,643,320 | B2 * | 5/2017 | Davey | B65G 1/1373 |
| 9,664,510 | B2 * | 5/2017 | Nathan | G06Q 10/08 |
| 9,792,434 | B1 | 10/2017 | Li et al. | |
| 9,910,436 | B1 | 3/2018 | Li et al. | |
| 10,265,859 | B2 * | 4/2019 | Deyle | B25J 9/1694 |
| 10,279,488 | B2 | 5/2019 | Li et al. | |
| 10,384,351 | B2 * | 8/2019 | Deyle | G05D 1/0094 |
| 10,414,052 | B2 * | 9/2019 | Deyle | B25J 11/008 |
| 10,478,973 | B2 * | 11/2019 | Deyle | B25J 13/086 |
| 10,486,313 | B2 * | 11/2019 | Deyle | G08B 13/196 |
| 10,514,837 | B1 | 12/2019 | Li | |
| 10,991,242 | B2 * | 4/2021 | Taylor | H04Q 9/00 |
| 2003/0229474 | A1 * | 12/2003 | Suzuki | G08B 13/19623 702/188 |
| 2004/0073337 | A1 | 4/2004 | McKee et al. | |
| 2004/0093650 | A1 | 5/2004 | Martins et al. | |
| 2004/0095149 | A1 | 5/2004 | Chen et al. | |
| 2004/0189691 | A1 * | 9/2004 | Jojic | G06F 16/745 715/720 |
| 2005/0257241 | A1 * | 11/2005 | Faulkner | G06F 16/78 725/92 |
| 2006/0206289 | A1 | 9/2006 | Stake et al. | |
| 2007/0154190 | A1 * | 7/2007 | Gilley | H04N 21/2743 386/241 |
| 2008/0027591 | A1 * | 1/2008 | Lenser | G05D 1/0251 701/2 |
| 2008/0133054 | A1 | 6/2008 | Kim et al. | |
| 2008/0243305 | A1 | 10/2008 | Lee et al. | |
| 2009/0143913 | A1 | 6/2009 | Kim et al. | |
| 2009/0198376 | A1 | 8/2009 | Friedman et al. | |
| 2010/0118147 | A1 * | 5/2010 | Dorneich | H04N 21/2187 348/155 |
| 2010/0131148 | A1 | 5/2010 | Camhi et al. | |
| 2010/0274573 | A1 | 10/2010 | Feied et al. | |
| 2010/0308769 | A1 | 12/2010 | Baba | |
| 2011/0010010 | A1 | 1/2011 | Kai et al. | |
| 2011/0098056 | A1 | 4/2011 | Rhoads et al. | |
| 2011/0135189 | A1 | 6/2011 | Lee | |
| 2011/0288684 | A1 * | 11/2011 | Farlow | G05D 1/0022 700/264 |
| 2012/0150966 | A1 * | 6/2012 | Fan | G08B 27/003 709/206 |
| 2012/0166971 | A1 * | 6/2012 | Sachson | G06Q 50/01 715/753 |
| 2012/0185095 | A1 * | 7/2012 | Rosenstein | G05D 1/0227 700/259 |
| 2012/0197439 | A1 | 8/2012 | Wang et al. | |
| 2012/0215380 | A1 * | 8/2012 | Fouillade | G05D 1/0038 701/2 |
| 2012/0265391 | A1 | 10/2012 | Letsky | |
| 2012/0277914 | A1 * | 11/2012 | Crow | H04N 5/23218 700/259 |
| 2013/0024025 | A1 | 1/2013 | Hsu | |
| 2013/0088352 | A1 * | 4/2013 | Amis | G08B 15/002 340/540 |
| 2013/0117867 | A1 | 5/2013 | Fung | |
| 2013/0123980 | A1 | 5/2013 | Seo | |
| 2013/0138246 | A1 * | 5/2013 | Gutmann | G05D 1/0274 700/253 |
| 2013/0158748 | A1 | 6/2013 | Baillie | |
| 2013/0197718 | A1 | 8/2013 | Lee et al. | |
| 2013/0204430 | A1 * | 8/2013 | Davey | G06F 17/00 700/216 |
| 2013/0245827 | A1 | 9/2013 | Shetty | |
| 2013/0325244 | A1 * | 12/2013 | Wang | G06T 11/00 701/26 |
| 2014/0009561 | A1 * | 1/2014 | Sutherland | F16M 11/42 348/14.05 |
| 2014/0048593 | A1 * | 2/2014 | Hoganson | G16H 40/67 235/376 |
| 2014/0087780 | A1 * | 3/2014 | Abhyanker | G06Q 50/01 455/521 |
| 2014/0180478 | A1 | 6/2014 | Letsky | |
| 2014/0196025 | A1 * | 7/2014 | Corinella | H04W 4/21 717/178 |
| 2014/0222206 | A1 * | 8/2014 | Mead | G02B 5/20 700/259 |
| 2014/0254896 | A1 * | 9/2014 | Zhou | G05D 1/0278 382/124 |
| 2014/0266669 | A1 * | 9/2014 | Fadell | H04W 4/80 340/501 |
| 2014/0304787 | A1 * | 10/2014 | Kurien | G06F 21/00 726/6 |
| 2014/0316557 | A1 | 10/2014 | Jones et al. | |
| 2014/0324271 | A1 | 10/2014 | Oh et al. | |
| 2014/0333412 | A1 * | 11/2014 | Lewis | G07C 9/22 340/5.2 |
| 2014/0350725 | A1 | 11/2014 | Lafary et al. | |
| 2014/0358811 | A1 * | 12/2014 | Cama | G06Q 10/00 705/325 |
| 2014/0379296 | A1 * | 12/2014 | Nathan | G06V 10/811 702/150 |
| 2015/0051783 | A1 | 2/2015 | Tamir et al. | |
| 2015/0073598 | A1 * | 3/2015 | Rosenstein | B25J 5/007 700/264 |
| 2015/0145643 | A1 * | 5/2015 | Fadell | G08B 27/003 340/5.51 |
| 2015/0151646 | A1 | 6/2015 | Noiri | |

(56) References Cited

U.S. PATENT DOCUMENTS

| | | | |
|---|---|---|---|
| 2015/0154249 A1* | 6/2015 | Dave | G06Q 50/10 707/758 |
| 2015/0154263 A1* | 6/2015 | Boddhu | G06N 5/04 707/737 |
| 2015/0154501 A1* | 6/2015 | Boddhu | G06F 40/279 706/52 |
| 2015/0158182 A1* | 6/2015 | Farlow | B25J 19/023 700/259 |
| 2015/0165895 A1* | 6/2015 | Menor | B60K 7/0007 701/23 |
| 2015/0185034 A1* | 7/2015 | Abhyanker | G06Q 50/01 701/23 |
| 2015/0186378 A1* | 7/2015 | Berlingerio | H04L 51/30 707/748 |
| 2015/0190927 A1* | 7/2015 | Sutherland | B25J 11/009 700/259 |
| 2015/0205298 A1* | 7/2015 | Stoschek | B60L 50/60 701/23 |
| 2015/0242591 A1* | 8/2015 | Davey | G16H 40/67 700/216 |
| 2015/0314449 A1* | 11/2015 | Wang | G06T 11/60 700/259 |
| 2015/0336270 A1* | 11/2015 | Storr | B25J 9/1674 700/245 |
| 2016/0019466 A1* | 1/2016 | Lightner | G06F 40/284 706/12 |
| 2016/0019470 A1* | 1/2016 | Lightner | H04W 4/21 706/12 |
| 2016/0046021 A1* | 2/2016 | Wang | G06F 3/04847 700/252 |
| 2016/0148363 A1* | 5/2016 | Phan | G06K 9/00664 348/142 |
| 2016/0205556 A1* | 7/2016 | Borghei | H04M 3/42221 455/411 |
| 2016/0275092 A1* | 9/2016 | Black | G06F 3/0484 |
| 2017/0136631 A1 | 5/2017 | Li et al. | |
| 2017/0217027 A1 | 8/2017 | Boucard | |
| 2017/0225321 A1* | 8/2017 | Deyle | G06K 7/10297 |
| 2017/0225332 A1* | 8/2017 | Deyle | G05D 1/0094 |
| 2017/0225334 A1* | 8/2017 | Deyle | G05D 1/0094 |
| 2017/0225336 A1* | 8/2017 | Deyle | B25J 5/007 |
| 2017/0266813 A1* | 9/2017 | Davey | G06F 30/13 |
| 2018/0000300 A1 | 1/2018 | Yoon et al. | |
| 2018/0079083 A1* | 3/2018 | Davey | G16H 20/13 |
| 2019/0193276 A1* | 6/2019 | Deyle | B25J 13/006 |
| 2019/0258251 A1 | 8/2019 | Ditty et al. | |
| 2019/0329421 A1* | 10/2019 | Deyle | B25J 5/007 |
| 2020/0039081 A1* | 2/2020 | Deyle | B25J 11/002 |
| 2020/0061841 A1* | 2/2020 | Davey | G16H 20/10 |

OTHER PUBLICATIONS

Search Query Report from IP.com (performed Mar. 6, 2022) (Year: 2022).*
Search Query Report from IP.com (performed Sep. 22, 2022) (Year: 2022).*
U.S. Appl. No. 14/751,124 Notice of Allowance dated Sep. 12, 2017.
U.S. Appl. No. 15/695,861 Notice of Allowance dated Oct. 24, 2019.
U.S. Appl. No. 15/215,540 Office Action dated May 18, 2018.
U.S. Appl. No. 15/875,987 Notice of Allowance dated Nov. 6, 2019.
U.S. Appl. No. 15/875,987 Office Action dated Apr. 23, 2018.
Co-pending U.S. Appl. No. 17/148,346, inventors Li; William Santana et al., filed Jan. 13, 2021.
U.S. Appl. No. 16/360,643 Notice of Allowance dated Jan. 8, 2021.
14751124 STIC Search Strategy (Requested).
Andreasson et al. Has Something Changed Here? Autonomous Difference Detection for Security Patrol Robots. IEEE Xplore; Oct. 2007, pp. 3429-3435.
Co-pending U.S. Appl. No. 14/836,857, filed Aug. 26, 2015.
Co-pending U.S. Appl. No. 15/875,987, filed Jan. 19, 2018.
Co-pending U.S. Appl. No. 16/360,643, filed Mar. 21, 2019.
Mirgorodskiy, et al. Autonomous analysis of interactive systems with self-propelled instrumentation. Copyright 2004, Society of Photo-Optical Instrumentation Engineers. Published Multimedia Computing and Networking Conference. 15 pages.
Nagy et al. Police Robots and the Prüm Convention. Academia.edu, 2009. 4 pages.
Notice of Allowance dated Jan. 6, 2016 for U.S. Appl. No. 14/599,073.
Notice of Allowance dated Jan. 10, 2018 for U.S. Appl. No. 14/751,115.
Notice of Allowance dated Jun. 15, 2017 for U.S. Appl. No. 14/751,124.
Notice of Allowance dated Nov. 29, 2017 for U.S. Appl. No. 14/751,115.
Office action dated Jun. 7, 2016 for U.S. Appl. No. 14/751,115.
Office Action dated Jul. 10, 2017 for U.S. Appl. No. 14/751,115.
Office Action dated Sep. 27, 2016 for U.S. Appl. No. 14/751,124.
U.S. Appl. No. 14/836,857 Office Action dated Feb. 13, 2019.
U.S. Appl. No. 14/836,857 Office Action dated May 15, 2018.
U.S. Appl. No. 15/215,540 Notice of Allowance dated Dec. 21, 2018.
U.S. Appl. No. 15/215,540 Notice of Allowance dated Mar. 25, 2019.
U.S. Appl. No. 15/695,861 Office Action dated Jan. 22, 2019.
U.S. Appl. No. 15/695,861 Notice of allowance dated Aug. 21, 2019.
U.S. Appl. No. 15/875,987 Notice of Allowance dated Jun. 5, 2019.
U.S. Appl. No. 15/875,987 Office Action dated Oct. 26, 2018.
U.S. Appl. No. 14/836,857 Office Action dated Sep. 18, 2019.
Co-pending U.S. Appl. No. 14/599,344, inventors William; Santana Li et al., filed Jan. 16, 2015.
Co-pending U.S. Appl. No. 16/820,189, inventors Li; William Santana et al., filed Mar. 16, 2020.
U.S. Appl. No. 16/360,643 Notice of Allowance dated Sep. 22, 2020.
U.S. Appl. No. 16/820,189 Office Action dated Sep. 15, 2022.

* cited by examiner

FIG. 9

SYSTEMS AND METHODS FOR SECURITY DATA ANALYSIS AND DISPLAY

CROSS-REFERENCE

This application is a continuation application of U.S. application Ser. No. 15/695,861, filed Sep. 5, 2017, which is a continuation-in-part application of U.S. application Ser. No. 14/751,124, filed Jun. 25, 2015, which is a continuation application of U.S. application Ser. No. 14/599,344, filed Jan. 16, 2015, which claims the benefit of U.S. Provisional Application No. 61/929,003, filed Jan. 17, 2014, which applications are incorporated herein by reference.

BACKGROUND

Crime is a significant problem that has a large detrimental effect, both personally and economically. Security systems may be implemented to detect and/or prevent the occurrence of crime. Conventional security systems typically employ a combination of surveillance devices (e.g., cameras, alarms) and security personnel (e.g., security guards, law enforcement officers) in order to monitor an environment. In some instances, security data collected by a plurality of surveillance devices may be transmitted to a remote monitoring center. Existing security systems, however, may be costly to implement, due to the large number of security personnel needed for effective surveillance.

SUMMARY

A need exists for improved systems and methods for providing security services. In some embodiments, the security systems described herein obtain security data from a plurality of security data sources, analyze the security data (e.g., to detect and/or predict the occurrence security events), and provide the analysis results to one or more customers of the security services. The disclosed systems and methods facilitate the collection, analysis and evaluation of large volumes of security data, thereby increasing the resources available to security personnel for efficiently assessing and responding to critical situations. Additionally, various embodiments of the present disclosure provide methods and systems for controlling autonomous data machines based on the obtained security data, thus enhancing the capabilities of such machines to respond to detected and/or predicted security events.

Thus, in one aspect, the present disclosure provides a method for controlling an autonomous data machine situated near a monitored environment. The method comprises: obtaining security data from a plurality of data sources; analyzing the security data to generate an analysis result; determining, based on the analysis result, an action to be performed by the autonomous data machine; and transmitting a command to the autonomous data machine causing it to perform the action. In some embodiments, the plurality of data sources comprises at least one social media feed associated with the monitored environment In another aspect, a system for detecting and responding to security events within a monitored environment is provided. The system comprises a self-propelled autonomous data machine and one or more processors. The one or more processors can be individually or collectively configured to: receive security data related to the monitored environment from a plurality of data sources, the plurality of data sources comprising at least two of the following: a sensor, a social media feed, or a security database; detect that a security event has occurred within the monitored environment, based on the security data; determine an action to be performed by the autonomous data machine in response to the security event; and output a command to the autonomous data machine in order to cause the autonomous data machine to perform the action.

In some embodiments, the one or more processors are situated at a location remote from at least one of the following: the monitored environment, the plurality of data sources, or the autonomous data machine.

In some embodiments, the plurality of data sources comprises the sensor, and the sensor is an image sensor, an audio sensor, a thermal sensor, an infrared sensor, a proximity sensor, a motion sensor, or a position sensor. In some embodiments, the plurality of data sources comprises the sensor, and the sensor is carried by the autonomous data machine.

In some embodiments, the plurality of data sources comprises the social media feed, and the occurrence of the security event is detected by at least detecting an increase in activity related to the security event on the social media feed.

In some embodiments, the system further comprises a display unit configured to display at least a subset of the security data to a user entity in a plurality of different visual contexts. The plurality of different visual contexts can comprise one or more of the following: a geographical map, a timeline, a social media feed, or a sensor feed.

In some embodiments, the one or more processors are further configured to transmit information regarding the security event to a user entity.

In some embodiments, the security event comprises at least one of the following: occurrence of a crime, occurrence of potential criminal activity, occurrence of an accident, or occurrence of an emergency.

In some embodiments, the action comprises navigating to a location associated with the security event. The action can comprise collecting data related to the security event using one or more sensors.

In another aspect, a method for detecting and responding to security events within a monitored environment using a self-propelled autonomous data machine is provided. The method comprises: receiving, at one or more processors, security data related to the monitored environment from a plurality of data sources, the plurality of data sources comprising at least two of the following: a sensor, a social media feed, or a security database; detecting, with aid of the one or more processors, that a security event has occurred within the monitored environment, based on the security data; determining, with aid of the one or more processors, an action to be performed by the autonomous data machine in response to the security event; and outputting, from the one or more processors, a command to the autonomous data machine in order to cause the autonomous data machine to perform the action.

In some embodiments, the one or more processors are situated at a location remote from at least one of the following: the monitored environment, the plurality of data sources, or the autonomous data machine.

In some embodiments, the plurality of data sources comprises the sensor, and the sensor is an image sensor, an audio sensor, a thermal sensor, an infrared sensor, a proximity sensor, a motion sensor, or a position sensor. In some embodiments, the plurality of data sources comprises the sensor, and the sensor is carried by the autonomous data machine.

In some embodiments, the plurality of data sources comprises the social media feed, and detecting that the security event has occurred comprises detecting an increase in activity related to the security event on the social media feed.

In some embodiments, the method further comprises displaying at least a subset of the security data to a user entity in a plurality of different visual contexts via a display. The plurality of different visual contexts can comprise one or more of the following: a geographical map, a timeline, a social media feed, or a sensor feed.

In some embodiments, the method further comprises transmitting, with aid of the one or more processors, information regarding the security event to a user entity.

In some embodiments, the security event comprises at least one of the following: occurrence of a crime, occurrence of potential criminal activity, occurrence of an accident, or occurrence of an emergency.

In some embodiments, the action comprises navigating to a location associated with the security event. The action can comprise collecting data related to the security event using one or more sensors.

In another aspect, a system for responding to predicted security events within a monitored environment is provided. The system comprises a self-propelled autonomous data machine and one or more processors. The one or more processors can be individually or collectively configured to: receive security data related to the monitored environment from a plurality of data sources, the plurality of data sources comprising at least one of the following: a sensor, a social media feed, or a security database; determine that a predicted security event is likely to occur within the monitored environment, based on the security data; determine an action to be performed by the autonomous data machine in response to the predicted security event; and output a command to the autonomous data machine in order to cause the autonomous data machine to perform the action.

In some embodiments, the one or more processors are situated at a location remote from at least one of the following: the monitored environment, the plurality of data sources, or the autonomous data machine.

In some embodiments, the plurality of data sources comprises the sensor, and the sensor is an image sensor, an audio sensor, a thermal sensor, an infrared sensor, a proximity sensor, a motion sensor, or a position sensor. In some embodiments, the plurality of data sources comprises the sensor, and the sensor is carried by the autonomous data machine.

In some embodiments, the plurality of data sources comprises the security database, and the security database comprises historical security data for the monitored environment.

In some embodiments, the system further comprises a display unit configured to display at least a subset of the security data to a user entity in a plurality of different visual contexts. The plurality of different visual contexts can comprise one or more of the following: a geographical map, a timeline, a social media feed, or a sensor feed.

In some embodiments, the one or more processors are further configured to transmit information regarding the predicted security event to a user entity.

In some embodiments, the predicted security event comprises at least one of the following: occurrence of a crime, occurrence of potential criminal activity, occurrence of an accident, or occurrence of an emergency.

In some embodiments, the action comprises navigating to a location associated with the predicted security event. The action can comprise collecting data related to the predicted security event using one or more sensors.

In another aspect, a method for responding to predicted security events within a monitored environment using a self-propelled autonomous data machine is provided. The method comprises: receiving, at one or more processors, security data related to the monitored environment from a plurality of data sources, the plurality of data sources comprising at least one of the following: a sensor, a social media feed, or a security database; determining, with aid of the one or more processors, that a predicted security event is likely to occur within the monitored environment, based on the security data; determining, with aid of the one or more processors, an action to be performed by the autonomous data machine in response to the predicted security event; and outputting, from the one or more processors a command to the autonomous data machine in order to cause the autonomous data machine to perform the action.

In some embodiments, the one or more processors are situated at a location remote from at least one of the following: the monitored environment, the plurality of data sources, or the autonomous data machine.

In some embodiments, the plurality of data sources comprises the sensor, and the sensor is an image sensor, an audio sensor, a thermal sensor, an infrared sensor, a proximity sensor, a motion sensor, or a position sensor. In some embodiments, the plurality of data sources comprises the sensor, and the sensor is carried by the autonomous data machine.

In some embodiments, the plurality of data sources comprises the security database, and the security database comprises historical security data for the monitored environment.

In some embodiments, the method further comprises displaying at least a subset of the security data to a user entity in a plurality of different visual contexts via a display. The plurality of different visual contexts can comprise one or more of the following: a geographical map, a timeline, a social media feed, or a sensor feed.

In some embodiments, the method further comprises transmitting, with aid of the one or more processors, information regarding the predicted security event to a user entity.

In some embodiments, the predicted security event comprises at least one of the following: occurrence of a crime, occurrence of potential criminal activity, occurrence of an accident, or occurrence of an emergency.

In some embodiments, the action comprises navigating to a location associated with the predicted security event. The action can comprise collecting data related to the predicted security event using one or more sensors.

Aspects of the invention may be directed to a system for collecting and displaying security data collected within a monitored environment. The system may comprise: a communication unit configured to communicate with a self-propelled robotic autonomous data machine; and one or more processors individually or collectively configured to: receive the security data related to the monitored environment from the autonomous data machine; and generate instructions to simultaneously display, on a user interface, (1) the security data from the autonomous data machine and (2) a corresponding a playback bar that shows a progress in time of the security data being displayed, wherein the playback bar comprises a thumbnail corresponding to the security data at the time where a user interacts with the playback bar, wherein the one or more processors are situated at a location remote from the autonomous data machine.

In some embodiments, the one or more processors are situated at a location remote from the monitored environment. The autonomous data machine may comprise one or more sensors used to collect the security data related to the monitored environment. The one or more sensors may comprise an image sensor, an audio sensor, a thermal sensor, an infrared sensor, a proximity sensor, a motion sensor, or a position sensor.

The security data displayed on the user interface may comprise a video captured by the autonomous data machine. The playback bar displayed on the user interface may show the progress in time of the video being displayed and a thumbnail showing a still image corresponding to the video at the time indicated on the bar where the user interacts with the playback bar. The user may interact with the playback bar by placing a mouse over a portion of the playback bar. The playback bar may comprise visual depictions of the time corresponding to the security data. The security data displayed may be affected by user interaction with the playback bar.

The one or more processors may further generate instructions to simultaneously display a map of a site comprising the autonomous data machine along with the security data and the corresponding playback bar. The map of the site may show the location of the autonomous data machine at the time corresponding to a time from which the security data is being displayed.

Aspects of the invention may be directed to a method for collecting badge information using a self-propelled robotic autonomous data machine, the method comprising: receiving, at one or more processors, badge information from the autonomous data machine; and generating, with aid of the one or more processors, instructions to display, on a user interface, identification information based on the received badge information, wherein the one or more processors are situated at a location remote from the autonomous data machine.

In some embodiments, the badge information is collected with aid of one or more sensors on-board the autonomous data machine. The one or more sensors may comprises an image capturing device. The identification information may comprise a description of a corresponding badge and a time at which the badge information was collected by the autonomous data machine.

The method may further comprise: generating, with aid of the one or more processors, instructions to display, on the user interface, image data captured by the autonomous data machine at a time at which the badge information was collected by the autonomous data machine. The image data may comprise an image of a corresponding badge. The image data may comprise multiple images captured by different image capture devices having different fields of view. A badge may be selected by a user viewing the user interface, and the image data corresponds to the badge information for the selected badge. A badge may be selected by a user viewing the user interface, and further details about an individual associated with the badge and the collection of the badge information from the individual are displayed on the user interface.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 9 illustrates a user interface for monitoring the status of autonomous data machines, in accordance with embodiments.

DETAILED DESCRIPTION

Figure 1:
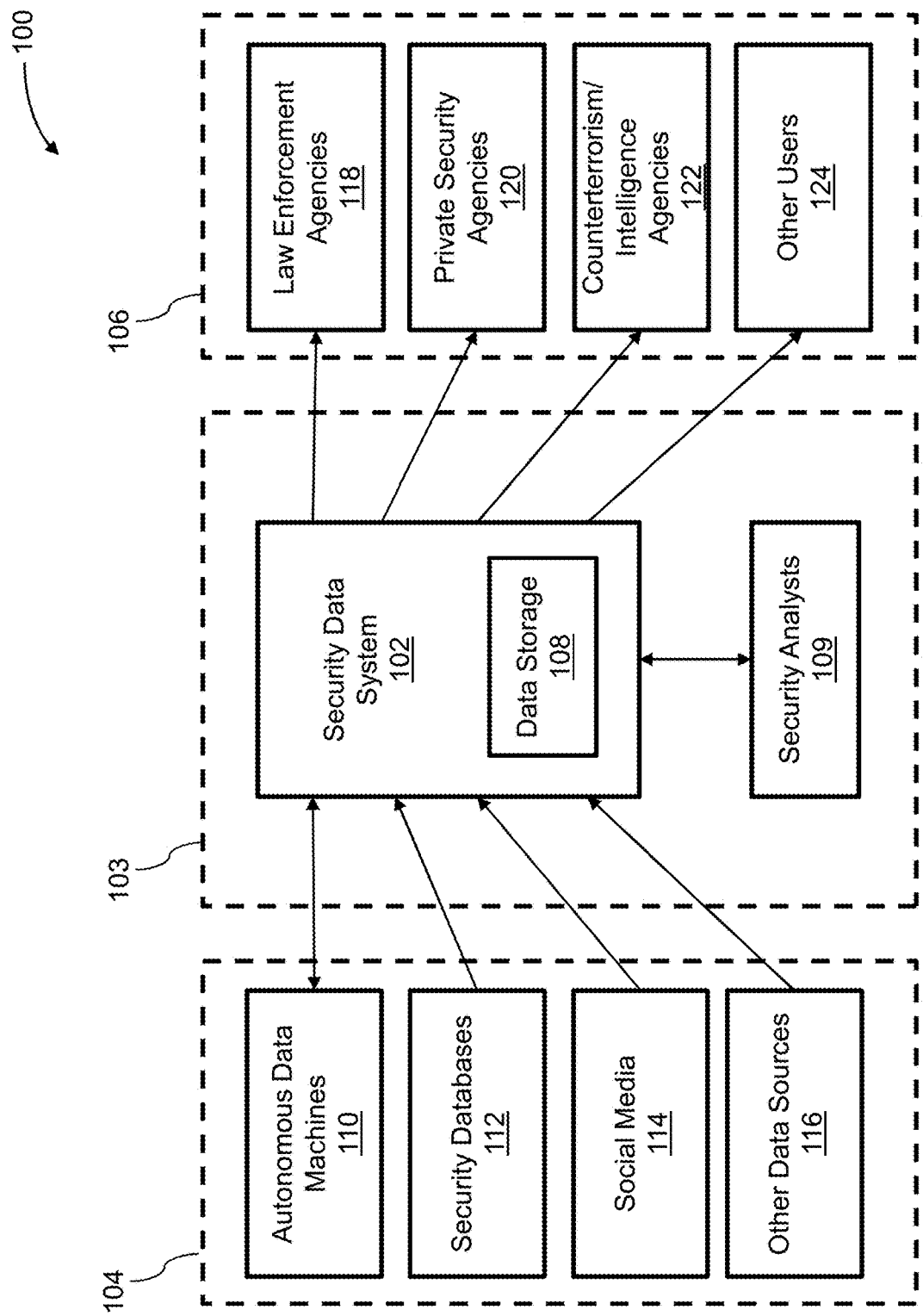
FIG. 1 illustrates an example topology in which a security data system may be implemented, in accordance with embodiments.

The systems and methods of the present disclosure provide improved techniques for the processing and analysis of security data. In some embodiments, the systems and methods described herein enable analysis of security data collected from a plurality of data sources and provide the results of the analysis to user entities in order to facilitate situation assessment, decision-making, and resource deployment. This approach may be used in conjunction with autonomous data machines configured to provide surveillance data of a local environment, thereby reducing the expenditures and resources needed for maintaining the desired level of security.

Security data may refer to any data generated and/or obtained for security purposes, including but not limited to surveillance, asset protection (which may encompass the protection of non-living assets (e.g., material items, property) as well as living assets (e.g., human beings)), law enforcement, counterterrorism, and the like, as well as any data that may be relevant to such activities. Security data can encompass data of any type, such as data files, data streams, data feeds, and the like. Such data may be of any size or format, and may be static or dynamic (e.g., real-time data). Examples of security data include but are not limited to: images, video, and/or audio data of a monitored environment (e.g., security camera footage); information regarding the identity and/or characteristics of entities of interest (e.g., license plate numbers of parked vehicles, facial recognition data of human entities); historical information regarding previous occurrences of crime or other security-related incidents (e.g., historical crime rates for a specified neighborhood); news a and/or social media content related to ongoing security events (e.g., blog posts describing occurrence of a crime), or combinations thereof.

Security data may originate from a variety of security data sources, including databases (e.g., public or private), servers, sensors (e.g., image sensors such as cameras, audio sensors such as microphones, thermal sensors, infrared sensors, proximity sensors such as LIDAR or ultrasonic sensors, motion sensors, position sensors such as global positioning systems (GPS), weather and other environmental sensors, etc.), surveillance devices (e.g., security cameras, alarms), security systems, human entities and/or organizations (e.g., security personnel, law enforcement agencies), or social media (e.g., dynamic feeds and/or static content). In some embodiments, a security data sources provides security data related to a specific monitored environment (e.g., public or private property such as a building, parking lot, street, etc.). In such instances, the security data source can be physically located near or within the monitored environment, such as a security camera located within a monitored building.

In some embodiments, security data can be obtained from an autonomous data machine, which can refer to a robotic device configured to navigate autonomously within an environment and collect data for security purposes. The autonomous data machine can be self-propelled, e.g., via one or more propulsion units (e.g., wheels, rotors, propellers). The autonomous data machine may be configured to operate without an individual on-board the autonomous data machine. The autonomous data machine may be configured so that there is no space for an individual to ride the autonomous data machine. Alternatively, the autonomous data machine may permit an individual to ride the autonomous data machine. The autonomous data machine may collect data from the surrounding environment using a plurality of sensors (e.g., image sensors such as cameras, audio sensors such as microphones, thermal sensors, infrared sensors, proximity sensors such as LIDAR or ultrasonic sensors, motion sensors, position sensors such as global positioning systems (GPS), weather and other environmental sensors including barometric pressure, temperature, humidity, pollution, smoke, $CO2$, noise, sensors for radiation, chemical and biological agents or hazards, sensors for electromagnetic radiation, sensors for presence and identity of radio, cellular or wireless devices, etc.). In some embodiments, at least some or all of the sensors carried by the autonomous data machine can serve as security data sources used to obtain security data. Data collected by the autonomous data machine may be transmitted to a suitable security data system in real-time, as described in further detail below. Exemplary autonomous data machines suitable for use with the embodiments provided herein are described in co-pending and commonly owned U.S. patent application Ser. No. 14/599,073, filed herewith, entitled "Autonomous Data Machines and Systems", the entirety of which is incorporated herein by reference.

The security data obtained by one or more security data sources can be transmitted to a security data system. In some embodiments, the security data system receives data from a plurality of different data sources (e.g., at least two, three, four, five, or more data sources). At least some or all of the data sources can be of different types (e.g., at least two, three, four, five, or more different types), such that various different types of security data are provided to the system. The security data provided to the system can be related to a single monitored environment, or a plurality of different monitored environments. The security data system can be situated at a location remote from the monitored environment(s) and/or the data sources. Alternatively, the security data system can be located within close proximity of the monitored environment(s) and/or the data sources.

The security data system can perform various operations on the received security data, such as storage, aggregation, filtering, displaying, analysis, processing, transmitting to another entity, or combinations thereof. Such operations can be performed autonomously, semi-autonomously, or manually with aid of a user. In some embodiments, the system analyzes the received data in order to detect and/or predict the occurrence of a security event within a monitored environment. Examples of security events include but are not limited to: occurrence of a crime, occurrence of potential criminal activity, occurrence of an accident, or occurrence of an emergency. The security data system can then determine an appropriate response to the security event, e.g., alerting a user entity such as a law enforcement agency.

In some embodiments, the security data system uses the security data as a basis for controlling one or more autonomous data machines. For example, the system can command an autonomous data machine to monitor a specified environment, e.g., by collecting sensor data of the environment. As another example, the system can instruct the autonomous data machine to respond to a security event that has occurred, is ongoing, or is predicted to occur within a monitored environment. The system can be situated at a location remote from the autonomous data machines, thereby allowing for remote monitoring and control of machine activity. The use of autonomous data machines in conjunction with the security data system receiving data from security data sources as described herein can allow for automated detection of and response to security events, thereby reducing human resources needed to provide security services.

FIG. 1 illustrates an example topology 100 in which a security data system 102 may be implemented. The security data system 102 can be employed by a security "control center" 103 acting as an interface between a plurality of security data sources 104 and user entities 106. The control center 103 may also be referred to herein as a "security operations center" or "network operations center." In some instances, the control center 103 may be an organized entity providing security services to one or more of the user entities 106, which may also be referred to herein as "customers." The control center 103 can be located at a single centralized physical site or a plurality of decentralized physical sites, and may be situated remotely from the environment(s) in which security operations take place.

The security data system 102 can include a data storage 108, which can be any storage system suitable for storing security data obtained from the data sources 104. The system 102 and/or the associated data storage 108 can be implemented across any suitable combination of physical or virtualized computing resources, (e.g., physical machines, virtual computing instances, virtualized storage systems, etc.) associated with the control center 103. In some embodiments, such resources may include distributed ("cloud") computing resources. Some or all of these resources may be situated at the physical location(s) of the control center 103. Alternatively, the system 102 and/or data storage can be implemented entirely at sites remote from the control center 103. In some instances, some or all of the components and/or functionalities of the system 102 may be integrated with existing security infrastructure and control setup of the user entities 106, via suitable interfaces (e.g., user entity-specific interfaces).

The control center 103 can include one or more security analysts 109, which may be personnel working in conjunction with the security data system 102 to provide security services to the user entities 106. In some embodiments, the system 102 may be fully automated, such that the security analysts 109 are optional and/or primarily intended to maintain normal operation of the system 102. Alternatively, some or all of the functions performed by the system 102 may require human intervention from the security analysts 109. For example, various functions may be performed partially or entirely by the security analysts 109. Any part of the functionalities described herein as being performed by the system 102 can also be performed by any suitable combination of the system 102 and the security analysts 109.

The security data sources 104 can include any devices, systems, or entities providing data relating to security purposes. For example, the data sources 104 can include autonomous data machines 110, security databases 112 (e.g., databases provided by law enforcement agencies, intelligence agencies, government, private security agencies), social media 114 (e.g., social media sites or feeds such as Facebook®, Twitter®), as well as other types of data sources 116 (e.g., surveillance devices and other sensors (e.g., fixed cameras, mobile phones), maps, weather information, directories). In some embodiments, the security data system 102 is situated at a location remote from some or all of the security data sources 104. The security data system 102 can be connected to the security data sources 104 using any suitable method, including wired or wireless communication (e.g., local area networks, wide area networks, telecommunication networks such as 3G or 4G cellular networks, cloud networks, WiFi, Ethernet, etc.). The system 102 can maintain a continuous connection with the security data sources 104. Alternatively, the system 102 may elect to connect to the data sources 104 only at certain times (e.g., when querying the data source for information). In some instances, such connections may be initiated by the data sources 104 (e.g., in response to a detected event) rather than by the system 102.

The security data system 102 can be implemented as a repository for storing and/or organizing security data originating from the security data sources 104. The data may be stored in the data storage 108 of the system 102. For example, data obtained by the autonomous data machines 110 can be transmitted to the system 102 (e.g., as a real-time data stream) and accumulated within the data storage 108. The system 102 may be used to store all of the data obtained from the data sources 104. Alternatively, in order to improve storage efficiency, only some of the data may be stored. Determination of the data to be stored may be based on required data fidelity, required retrieval time, relevance of the contained information, or any other suitable criterion. For example, the system 102 may elect not to store static information or information that is already being stored elsewhere (e.g., in a preexisting database). The system 102 may store the security data in a manner such that it can be searched and/or retrieved (e.g., in response to a request by a user entity 106 or a security analyst 109, or by the system 102 for future analysis).

In some embodiments, the system 102 can be configured to analyze the obtained security data, e.g., with aid of one or more processors. As previously mentioned, the analyses described herein can be entirely automated. Alternatively, some or all of the analyses may involve user interaction (e.g., input provided by the security analysts 109). In some embodiments, an initial analysis of the security data may be performed automatically by the system 102, then further refined by the security analysts 109. Such human-machine interactivity may advantageously combine the capabilities of the system 102 to process large volumes of data with the abilities of human analysts to evaluate and act upon such data, thereby improving the efficiency and quality of the analysis.

The security data analysis may involve calculating statistics and/or metrics, parsing (e.g., to identify the occurrence of keywords or other key values), aggregating, comparing with other data sets (e.g., data from other data sources, historical data), and so on. In some embodiments, image analysis techniques can be applied to suitable image data (e.g., photographs, videos, thermal images, infrared images, LIDAR images), such as facial recognition, optical character recognition (e.g., of street signs, license plates), or other pattern recognition methods. Similarly, audio analysis techniques such as voice analysis can be applied to suitable audio data. Furthermore, the process of analyzing the security data may involve annotating the data with objective criteria in order to support successive data analytics, such as for behavioral and predictive analysis. For example, the data can be annotated to include information such as time, date, location, data source, data type, or any other relevant parameters. Such annotations may be used, for instance, to index the data for searching.

Additionally, the system 102 may identify and/or classify events based on the security data. An event can include any security-related occurrence, such as the occurrence of a crime or potentially criminal activity, triggering of a security alarm or other surveillance device, placing of an emergency call, and so on. An event may involve a change in state of an entity of interest (e.g., an individual moving from one location to another, an increase in social media activity, etc.). In some embodiments, an event may be based on data obtained by one or more sensors (e.g., of the autonomous data machine 110 or other surveillance devices), such as abnormal or unexpected sensor values; sensor values achieving, exceeding, or falling under certain values or ranges of values (e.g., a noise level exceeding a predetermined threshold); sensor values indicative of security-related occurrences (e.g., image analysis detecting the presence of an intruder), and so on. The identified events may be classified using any suitable criterion, such as time, date, location, event type, significance, associated annotations, and so on. When desired, the events can be stored and indexed for search, such that a user entity 106 or security analyst 109 can retroactively query the system 102 for information relating to the event.

As another example, the system 102 may perform mapping and/or data aggregation in order to condense the information represented by the security data into a more comprehensible format and extract the key concepts found in the data. In some embodiments, a plurality of security data sets from different data sources can be aggregated into a single context (e.g., spatial, temporal, geographical, etc.). Aggregation may be applied to data of diverse types, formats, and sources, such that heterogeneous data can be presented to a user entity in a unified setting. For example, the aggregated data may be provided to a user entity as a map depicting how various data sets relate to each other (e.g., spatially, temporally, geographically, etc.). A map may be a visual representation of a plurality of data (e.g., a 2D or 3D graphical map). Alternatively, maps may be presented in other formats (e.g., an "audio map" generated by combining a plurality of audio samples which may be analyzed spatially). Where desired, maps may be based on static data (e.g., a preexisting geographical map), or may be dynamically generated based on obtained data (e.g., sensor data, such as from sensors of an autonomous data machine), or suitable combinations thereof. For example, a spatial map of an environment may include a point cloud generated based on 3D sensor data (e.g., LIDAR data) supplemented with additional data (e.g., camera data, thermal imaging data, audio data, etc.). The maps described herein can include dynamic and/or interactive elements. For instance, a map may be updated based on the underlying data (e.g., in real-time, at specified time intervals, when an event occurs, etc.). Such maps may be presented to a user entity 106 and/or a security analyst 109 via a suitable user interface (UI), as described below.

In a further example, the system 102 can create a profile of a monitored environment (e.g., neighborhoods, buildings) based on the security data. The profile can include information regarding one or more objects within the environment (e.g., vehicles, equipment, boxes, structures, buildings people). In some instances, the profile can include information regarding types of objects (e.g., cars, trucks, buildings, people) and/or specific instances of objects (a specific car, a specific person) associated with the profiled entity. The profile can be with respect to one or more parameters of the objects, such as quantity, motion, occurrence, location, or time. For example, the profile may include information on when and where a car with a specific license plate moved. As another example, the profile may include information on how many cars passed in a specific location and direction during a given time interval. In some instances, the profile can include historical data and/or predictive data relating to the environment and/or any associated objects. Such profile information may also be of interest to user entities that are not necessarily directly affiliated with security organizations, as described below.

In some embodiments, the system 102 can utilize the security data and/or the analyses described herein to generate predictive security assessments. The predictive security assessment can include estimations of the probability that a specified event (e.g., the occurrence of a crime) will occur, as well as predictions regarding other parameters associated with the event, such as the time, location, or type (e.g., type of crime) of the event. The assessment can also include predictions regarding security-related trends, statistics, or other characteristics applicable to a collection of events. The prediction can be generated by the system 102 based on risk parameters, time, location, historical data, behavioral analysis, and the like. In some embodiments, the system 102 can implement machine learning techniques in order to improve the accuracy of such assessments.

The predictive security assessments can be used to facilitate decision-making related to security, such as determining current and future impacts on security measures (e.g., need for and type of security monitoring devices and/or security personnel). The assessments can also be used to optimize the cost and effectiveness of security installations at a given location and/or time (e.g., relative to an insurance setup). Furthermore, the predictive security assessment can also be used to make other types of predictions. For example, the assessment can be utilized to determine the current and future impacts on real estate (e.g., value, maintenance costs), insurance (e.g., personal and/or property insurance, such as for a localized area (e.g., street block, individual houses or properties), for a specific time, or varying with time (e.g., during "peak" crime seasons in a specific period during the year)), and the like.

The system 102 may also use the analysis results to generate alerts. The alerts can be provided to user entities 106 and/or security analysts 109 in order to provide notification of relevant security events. For example, upon detecting that a critical security event has occurred (e.g., a crime has been committed), the system 102 may alert the security analysts 109, such that immediate actions can be taken to respond to the critical event. Such alerts can be transmitted to the user entities 106 and/or the security analysts 109 via a suitable UI of the system 102, as well as through other communication means (e.g., email, texts, social media). In some instances, the system 102 may enable the user entities 106 and/or security analysts 109 to specify conditions under which an alert is generated (e.g., when a specific type of event has occurred at a specific location, when a specific event occurs within a specific time interval).

The system 102 may provide the obtained security data and/or analysis results to one or more user entities 106. The user entities 106 may include security organizations such as law enforcement agencies 118, private security agencies 120, or counterterrorism or intelligence agencies 122. For example, the security organizations may utilize the information obtained from the system 102 in order to conduct forensics (e.g., for counterterrorism efforts, criminal investigations), evaluate and/or optimize their existing security infrastructure, respond to current security events, prepare for predicted security events, and so on. Additionally, in some embodiments, information may also be provided to other users 124, which may include user entities that are not directly affiliated with security organizations (e.g., mapping service providers, location-based service providers, construction companies, logistics companies, traffic analysts, parking providers, insurance providers, shopping facilities and other commercial entities, individual users, etc.). In some embodiments, only a subset of the security data and/or analysis results may be transmitted to the user entities 106, based on suitable criteria (e.g., relevance, significance, customer preferences). Conversely, all of the security data and/or analysis results obtained by the system 102 may be provided to the user entities 106. The security data and/or analysis results can be directly provided to the user entities 106 by the system 102 and the user entities 106. In such instances, the security analysts 109 can provide real-time review, decision support, mission planning, or security services to the user entities 106 in addition to communicating the security data and/or analysis results.

The security data and/or analysis results can be presented to the user entities 106 in any suitable manner, including visual representations (e.g., via a suitable graphical UI), and can be transmitted to a suitable device associated with the user entities 106 (e.g., computer, tablet, mobile device). The visual representations can be designed in order to facilitate user comprehension of the presented security data. For example, at least a subset of the security data and/or analysis results can be displayed to a user entity 106 (e.g., on a display unit such as a monitor or screen) in a plurality of different visual contexts (e.g., geographical map, timeline, social media feed, sensor feed, or combinations thereof). Additionally, in some embodiments, selected security-related information can also be made available to the general public (e.g., via a publicly accessible website, social media feed, etc). This "crowd-sourced" security may enable members of the general public to engage with and/or contribute to security provided by the system 102, which may serve as an important feedback loop to the prediction algorithms implemented by the system 102. Furthermore, public dissemination of such information may alleviate privacy concerns as well as enhance the ability of the public to participate in reducing crime.

In addition to providing the data analysis functionalities described herein, the system 102 can also be implemented as part of a control center 103 configured to monitor and/or direct the activities of one or more autonomous data machines 110. As previously described, the autonomous data machines 110 can transmit security data to the control center 103, and such security data can be analyzed and provided to user entities 106. Furthermore, the analysis results can be used to determine one or more actions to be performed by the autonomous data machines 110 (e.g., to respond to a security event). For example, the security analysts 109 at the control center 103 may direct the autonomous data machine 110 to: interact with the surrounding environment as well as with entities (e.g., people) within the environment; obtain data of a monitored environment (e.g., via one or more sensors); navigate towards or away from a location associated with a security event; and so on. When desired, the autonomous data machines 110 can be configured to communicate with people, such as via displayed images, text-to-speech synthesis (e.g., generated by an analyst 109 or automatically), or any other suitable method.

Figure 2A:
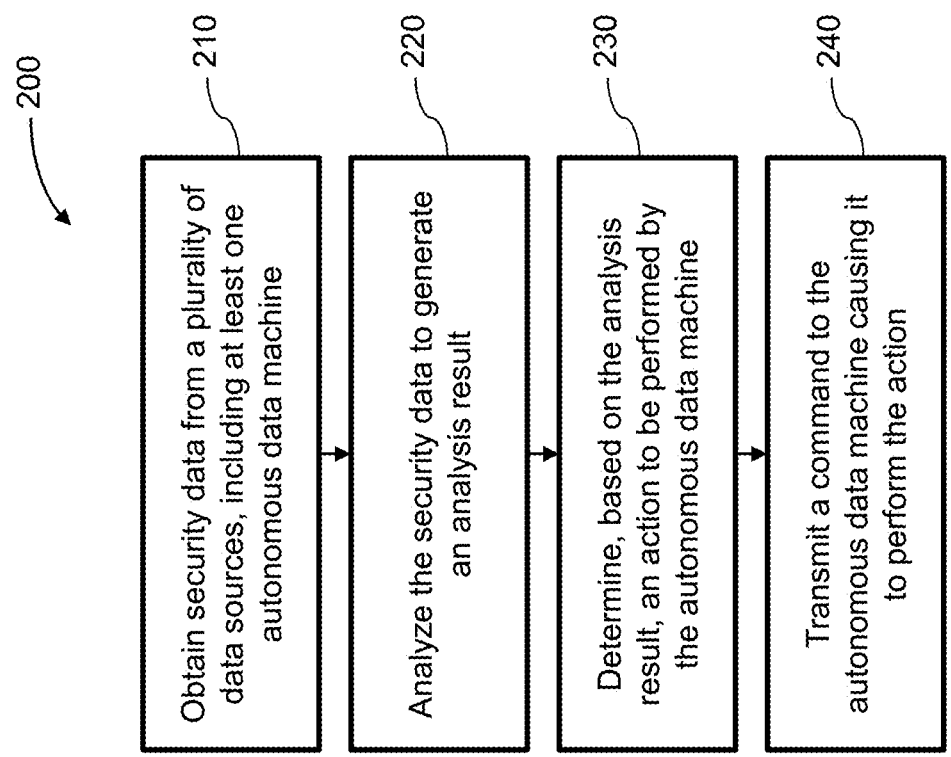
FIG. 2A is a schematic illustration of a method for controlling an autonomous data machine, in accordance with embodiments.

FIG. 2A is a schematic illustration of a method 200 for controlling an autonomous data machine, in accordance with embodiments. The method 200 can be practiced by any embodiments of the security data systems described herein, as well as by security analysts or other personnel interacting with such systems at a suitable control center. In some embodiments, some or all of the steps of the method 200 are performed with aid of one or more processors.

In step 210, security data is obtained from a plurality of data sources, including at least one autonomous data machine. The data sources can include any of the security data sources described herein, e.g., a social media feed, security database, sensor, etc. In some embodiments, the data sources, including the autonomous data machine, are situated at a location remote from the control center, and the security data is transmitted to the control center using suitable long-distance communication methods.

In step 220, the security data is analyzed to generate an analysis result. The analysis can be performed by a security data system, security analyst, or suitable combinations thereof, and can include any of the analyses previously described herein. In some embodiments, the security data can be analyzed in conjunction with preexisting data, such as historical security data.

In step 230, based on the analysis result, an action to be performed by the autonomous data machine is determined. The action can be determined automatically by the security data system, by the security analyst, or suitable combinations thereof. The action can be any action performable by the data machine, such as movement (e.g., to a different location, towards a target, away from a target, returning to a "home" location), collecting data (e.g., of a target, using a specified sensor or sensors), communication (e.g., with a person via images or synthesized speech, with the control center), or suitable combinations thereof.

In step 240, a command is transmitted to the autonomous data machine causing it to perform the action. The command can be transmitted using a long-distance communication method, similar to step 210.

Figure 2B:
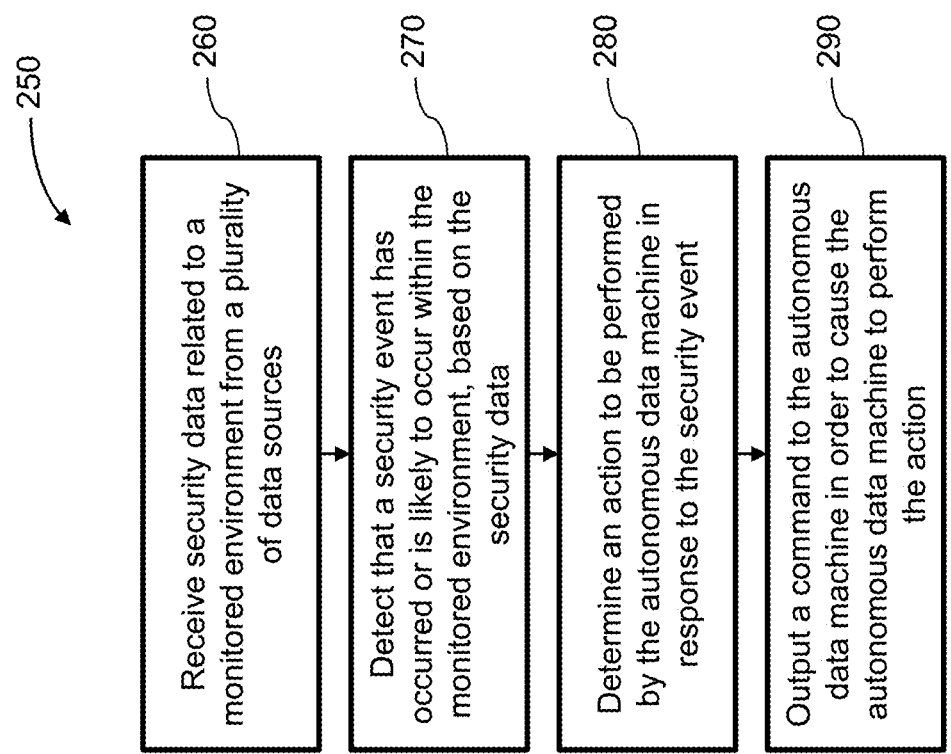
FIG. 2B illustrates a method for detecting and responding to security events, in accordance with embodiments.

FIG. 2B illustrates a method 250 for detecting and responding to security events within a monitored environment, in accordance with embodiments. The various steps of the method 250 can be performed by one or more processors of the security data systems described herein. Optionally, one or more steps of the method 250 can be performed with aid of a human operator, e.g., a security analyst. The method 250 can be repeated at predetermined time intervals in order to provide periodic updates regarding the security status of a monitored environment.

In step 260, security data related to a monitored environment is received from a plurality of data sources. The data sources can include any number and combination of the security data sources described herein. In some embodiments, the data sources include at least one of a sensor, a social media feed, or a security data base. In alternative embodiments, the data sources include at least two of a sensor, a social media feed, or a security database. The sensor can be stationary (e.g., affixed to a stationary support such as a wall) or mobile (e.g., self-propelled or carried by a mobile object). Optionally, the sensor can be carried by an autonomous data machine as previously described herein.

In step 270, it is detected that a security event has occurred or is likely to occur within the monitored environment, based on the security data. For example, the step 270 can involve detecting that a security event has occurred (e.g., a past or ongoing security event). Alternatively or in addition, the step 270 can involve determining that a predicted security event is likely to occur in the future. Various approaches can be used to detect and/or predict security events using security data, e.g., the analyses and assessments previously described herein in connection to FIG. 1. For example, in embodiments where the data sources include a social media feed, an increase in activity related to the security event on the social media event (e.g., increased frequency of blog posts or social media tags) can indicate the occurrence of the event. As another example, in embodiments where the data sources include a security database, historical security data for a monitored environment (e.g., trends in previous criminal activity) can indicate the likelihood that a predicted security event is likely to occur.

In step 280, an action to be performed by the autonomous data machine in response to the security event is determined. The determination can be performed automatically (e.g., by one or more processors), manually (e.g., with user input from a security analyst), or combinations thereof. Various types of actions can be performed by the autonomous data machine to respond to a previous, ongoing, or predicted security event, as previously described herein. For example, the action can involve the autonomous data machine navigating to a location associated with the security event (e.g., the location where the security event occurred or is predicted to occur). As another example, the action can involve the autonomous data machine collecting data related to the security event using one or more sensors (e.g., collecting image data at the scene of a crime).

In step 290, a command is outputted to the autonomous data machine in order to cause it to perform the action, similar to the step 240 of the method 200.

Figure 3:
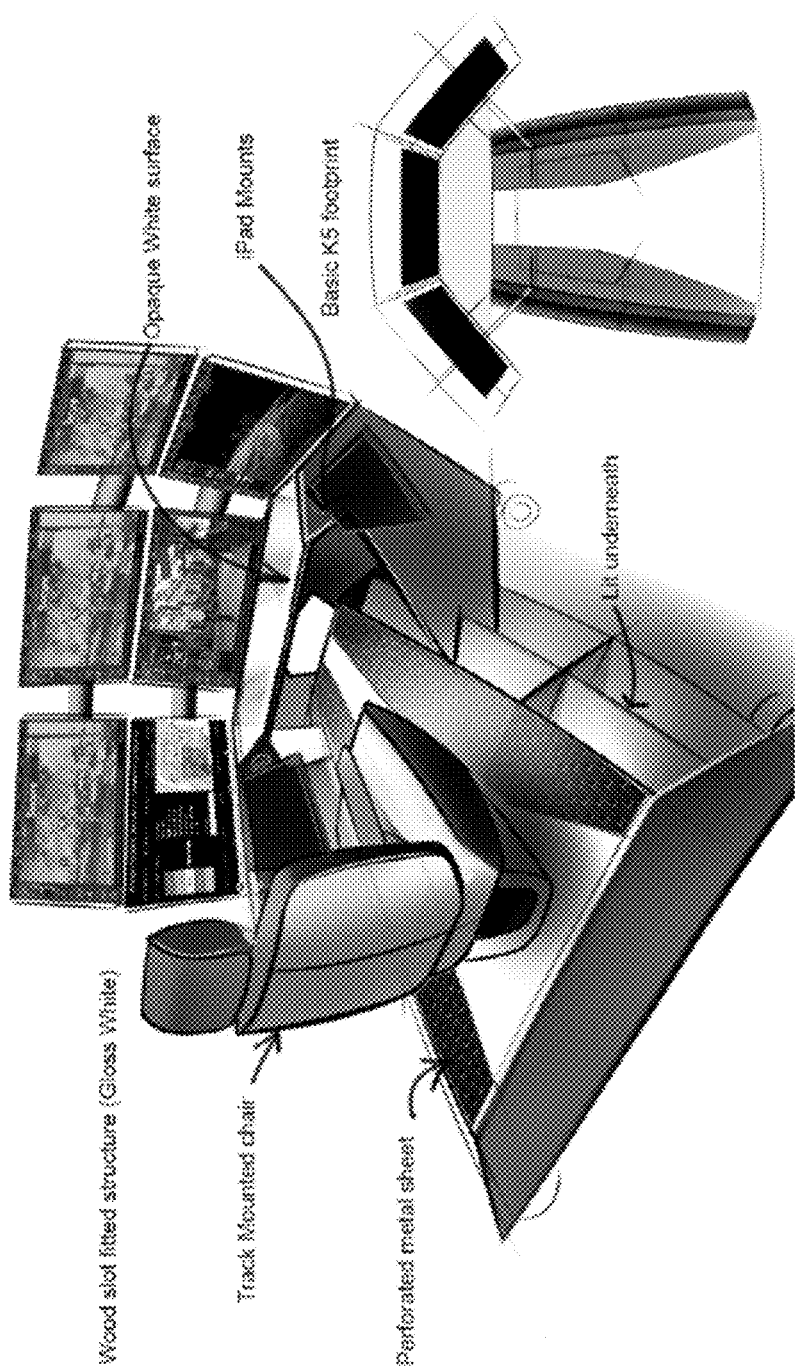
FIG. 3 illustrates a control center interface for a security analyst, in accordance with embodiments.

FIG. 3 illustrates a control center interface for a security analyst, in accordance with embodiments. The interface can be used by the security analyst to view security data and/or analysis results, analyze data, monitor and/or direct the activity of various surveillance apparatus (e.g., autonomous data machines), and/or communicate with user entities. The control center interface can include a suitable support platform upon which the analyst can be seated (e.g., a track-mounted chair). The interface can be connected to the security data system and include a plurality of display units (e.g., monitors, tablets, screens) for displaying security data and/or data analysis results provided by the security data system. In some embodiments, the display units can display real-time feeds of security data obtained by one or more sensors of an autonomous data machine, thereby enabling the security analyst to monitor the activity of the autonomous data machine. At least some of the display units can be configured to accept user input (e.g., provided by a mouse, keyboard, joystick, touchpad, gesture, voice command, etc.), which may be used to interact with the displayed information and enable the security analyst to perform some or all of the tasks described herein.

The security data and/or data analysis results provided by the security data system can be visually presented in the context of a suitable UI. Any of the UIs described herein can be displayed to a security analyst via a suitable control center interface (e.g., on a display unit). Alternatively or in addition, the disclosed UIs may be displayed to a user entity on a local device having a display (e.g., computer, tablet, mobile device). In some embodiments, a plurality of different UIs are implemented in order to display security data and/or analysis results to a user in a plurality of different visual contexts, thereby allowing the user to view diverse types of information as desired.

Figure 4:
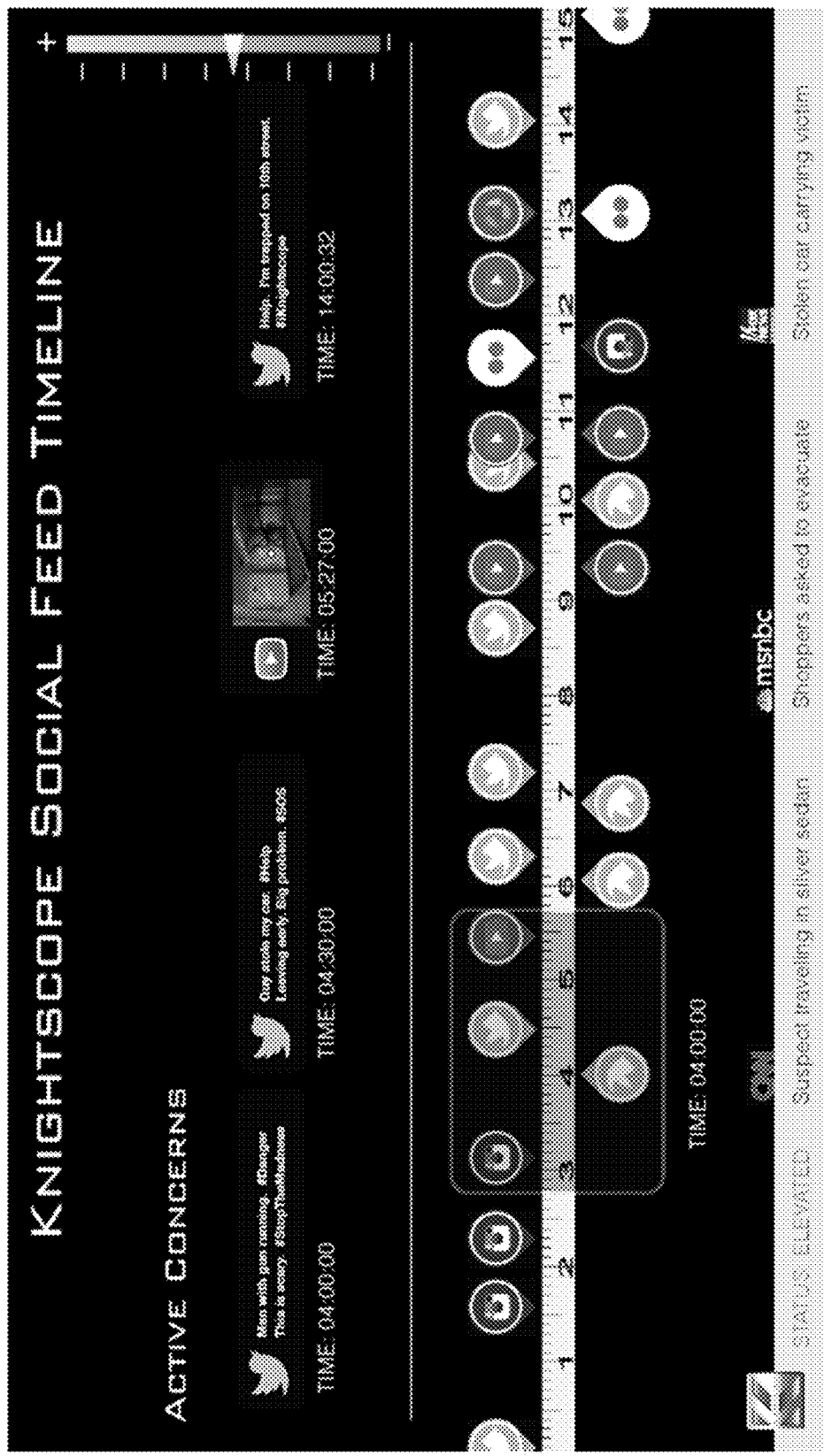
FIG. 4 illustrates a user interface for displaying a social media feed of security data, in accordance with embodiments.

FIG. 4 illustrates a UI for displaying a social media feed of security data, in accordance with embodiments. The UI can include a timeline along which icons representative of social media events (e.g., creation and/or posting of social media content) are situated in order to indicate their temporal relation to each other. The UI can include functionality for zooming in and out of the timeline (e.g., via a suitable zoom slider). In some embodiments, a user of the UI may be able to select certain regions of the timeline to view the events within that region in greater detail. For example, the events may be displayed above the timeline as images, video clips, text, or other graphical elements representing the key content of the event. The UI can include interactive links enabling the viewer to access the source of the social media from the UI.

Any suitable type of social media data can be displayed on the UI. Some example of social media data include blog posts, text messages (e.g., Twitter®), images (e.g., Instagram®, Flickr®, Picasa®), videos (e.g., YouTube®), and the like. In some embodiments, the social media data can be data that has been filtered, selected, or otherwise determined to be particularly relevant to security. The determination of relevant data for inclusion in the UI can be performed in any suitable manner. For example, social media data can be filtered for relevancy based on the geographical coordinates (e.g., latitude, longitude) associated with the content (e.g., a location from which a text message was sent, where an image was taken, etc.). The geographical filtering can employ techniques such as geo-fencing to select only social media data associated with a geographical region of interest. Alternatively or in addition, the social media data can be filtered based on the content of the data, such as the presence of specified key words, tags, or values; relevant images (e.g., determined using on image recognition algorithm), sounds, video clips; or any other suitable parameter.

Figure 5:
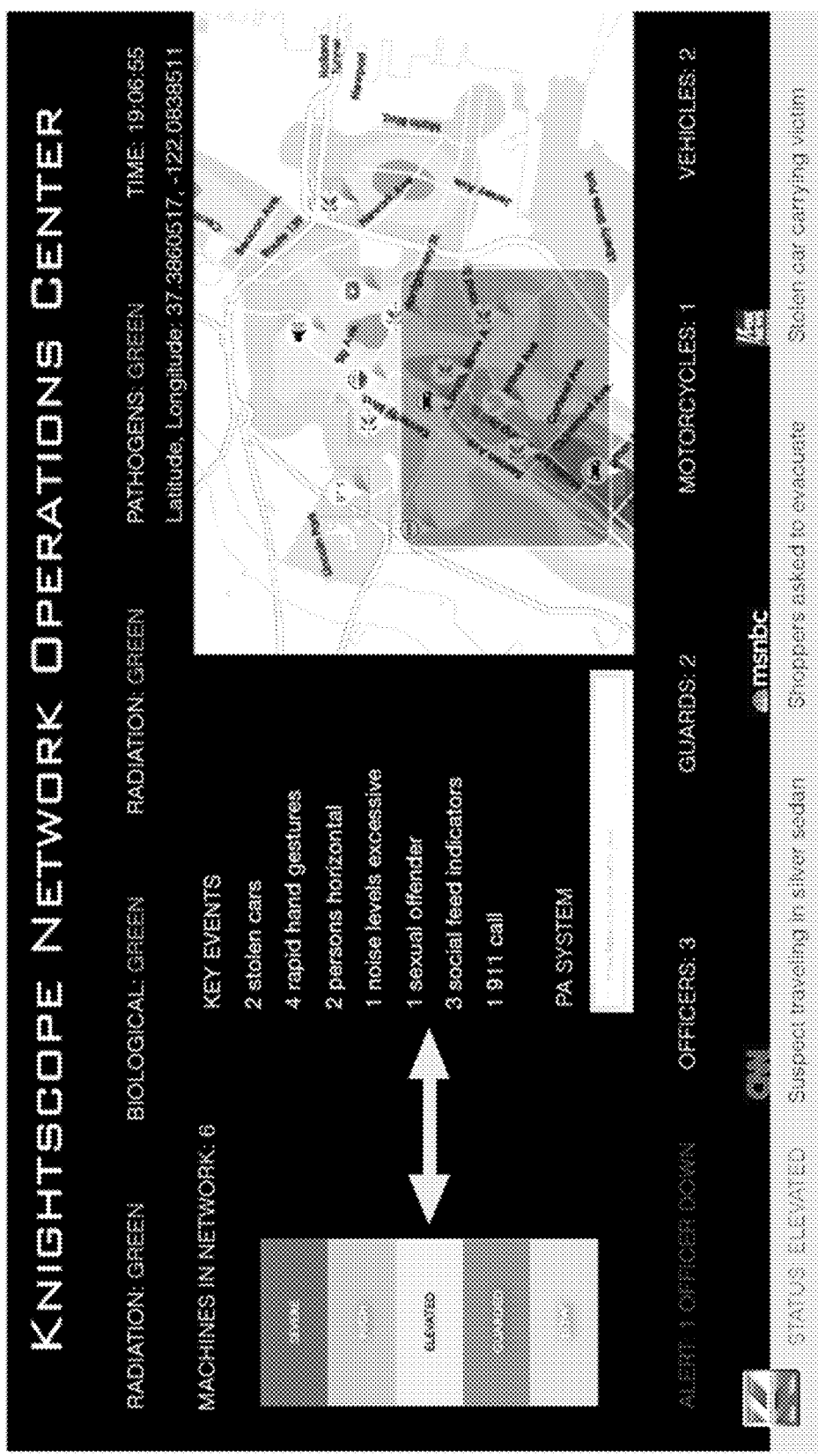
FIG. 5 illustrates a user interface for displaying a geographical map of security data, in accordance with embodiments.

FIG. 5 illustrates a UI for displaying a geographical map of security data, in accordance with embodiments. As previously mentioned, the map may provide a visual representation of a plurality of different security data types within a single geographical context. For example, security events can be represented on the map as icons indicating the location of their occurrence. Additionally, security-related social media data can also be represented on the map, and such social media data can be filtered for relevance, as previously described herein (e.g., via geo-fencing, key words, etc.). In some instances, the current position of one or more autonomous data machines can be displayed on the map. The UI can include functionality for zooming in and out of the map, such as zooming into a selected region of the map, in order to enable the viewer to examine the map at the desired level of detail. Additionally, in some embodiments, the map UI can be provided as part of a summary UI providing an overview of the current security status and/or any significant events. The summary UI may include information regarding the current status of different types of security threats (e.g., radiation, biological, pathogens, etc.), security activity (e.g., number of active security personnel, vehicles, autonomous data machines), and/or key events (e.g., occurrences of crimes or potentially crime-associated events).

In some embodiments, the map can be a heat map having color-coded indicators to represent the security alert level (or predicted security alert level) relative to various locations on the map. Examples of various security alert levels include "severe," "high," "elevated," "guarded," and "low."

The heat map can be overlaid over other types of maps (e.g., a geographical map) such that the spatial disposition of the security alert level can be viewed relative to other types of security data. In some instances, the security alert level may influence the behavior of the underlying security data system. For example, when the alert level is determined to be above a critical level for a certain location, the system can be configured to automatically respond (e.g., notify all user entities having assets at the location, direct autonomous data machines to move to the location, contact security personnel situated at or near the location).

Figure 6:
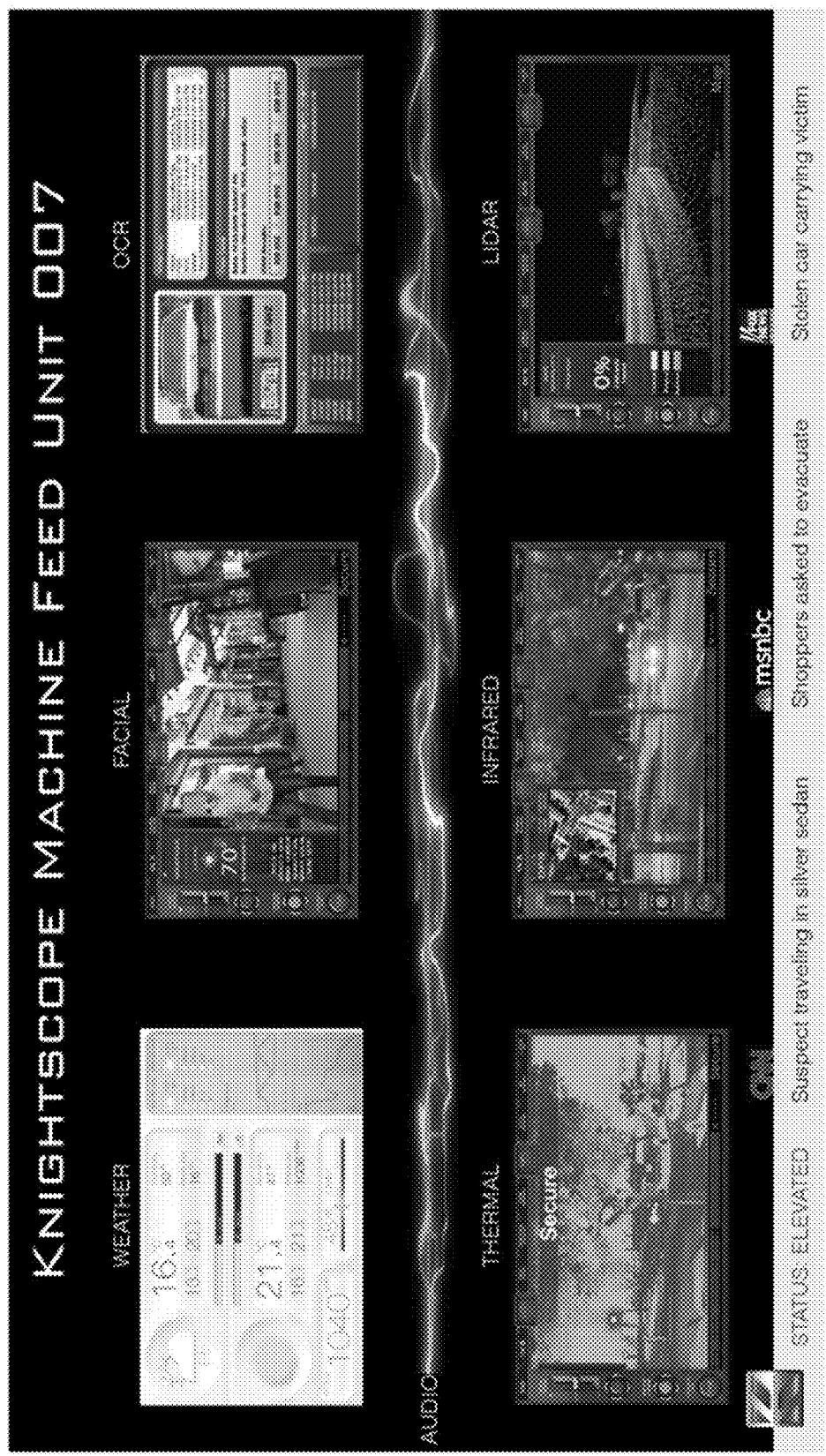
FIG. 6 illustrates a user interface for a sensor feed of security data, in accordance with embodiments.

FIG. 6 illustrates a UI for a sensor feed of security data, in accordance with embodiments. The sensor feed can display a visual representation of a plurality of different types of sensor data, such as weather data, facial recognition data, optical character recognition data, thermal data, infrared data, LIDAR data, and audio data. The feed may include the raw sensor data, processed data, and/or analytics performed on the sensor data (e.g., by the security data system). In some embodiments, the UI presents a real-time sensor feed of security data, thus enabling a security analyst to monitor and/or respond to occurrences at a remote location in real-time. The data can be obtained from one or more sensors of an autonomous data machine, as previously mentioned. Alternatively, the data can be provided by surveillance devices (e.g., fixed cameras) or other external sensors. The UI may simultaneously display security data from a plurality of different devices and/or machines. Alternatively, the UI may display data from a single device or machine only. In some instances, UI may enable the viewer to switch between sensor feeds from many different devices and/or machines.

Figure 7:
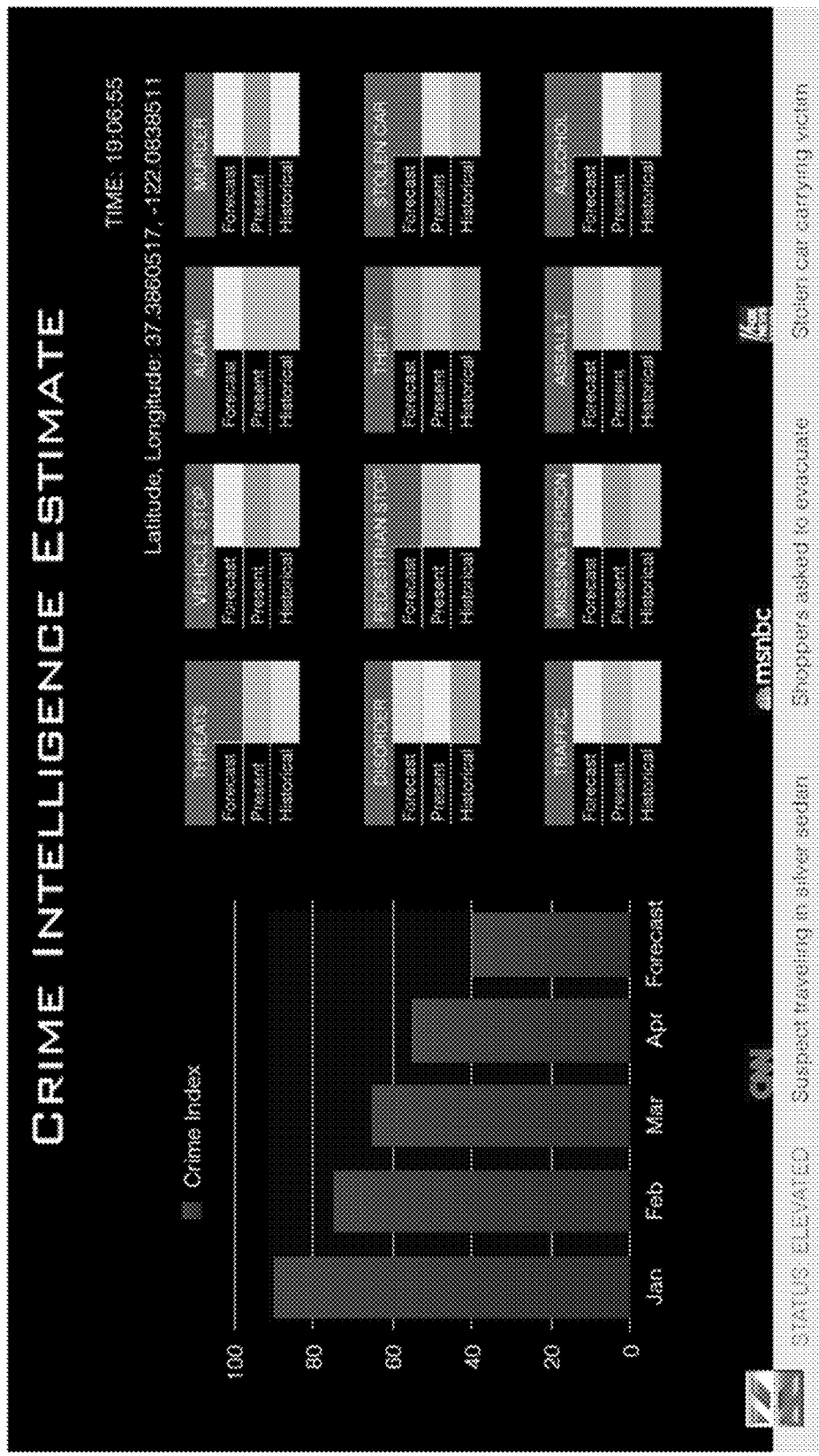
FIG. 7 illustrates a user interface for predictive security assessments, in accordance with embodiments.

FIG. 7 illustrates a UI for predictive security assessments ("crime intelligence estimate"), in accordance with embodiments. The UI may include historical, present, and/or predicted data for security-related events (e.g., crimes or crime-related events, such as threats, disorder, traffic, vehicle stops, pedestrian stops, missing persons, alarms, thefts, assaults, murders, stolen vehicles, alcohol, etc.). The information can be presented quantitatively (e.g., as a chart tracking the overall crime index over time) or qualitatively (e.g., color coding indicating the frequency of various crimes).

Figure 8:
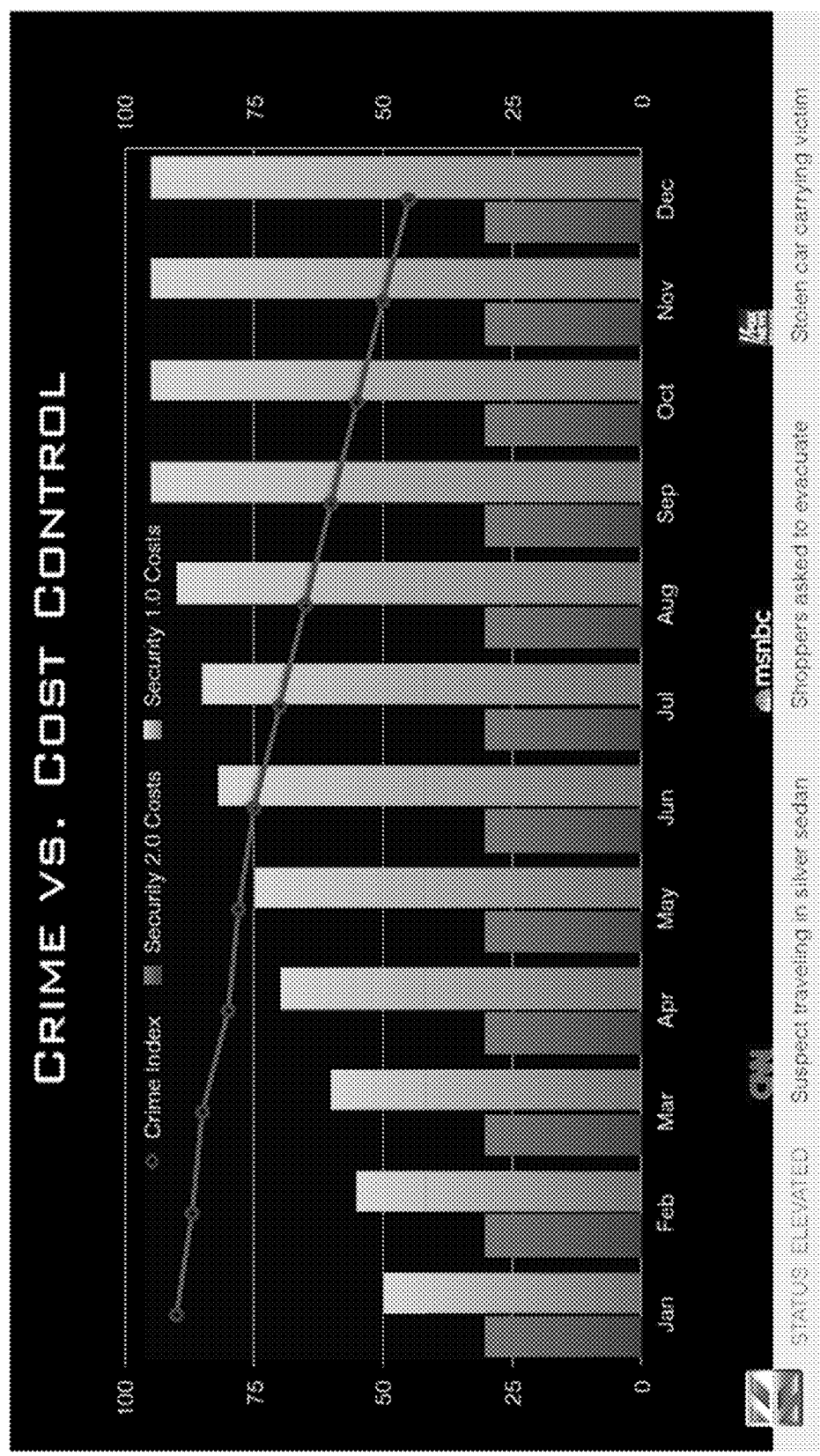
FIG. 8 illustrates a user interface for evaluating current security practices, in accordance with embodiments.

FIG. 8 illustrates a UI for evaluating current security practices, in accordance with embodiments. The UI can present any information relevant to evaluating and/or optimizing security practices, such as cost, frequency of events (e.g., crime index), resources, time, and the like. In some instances, the UI can include visual representations comparing the performance of a plurality of different security methodologies, such as graphs, charts, images, maps, and other graphical elements.

Figure 9:
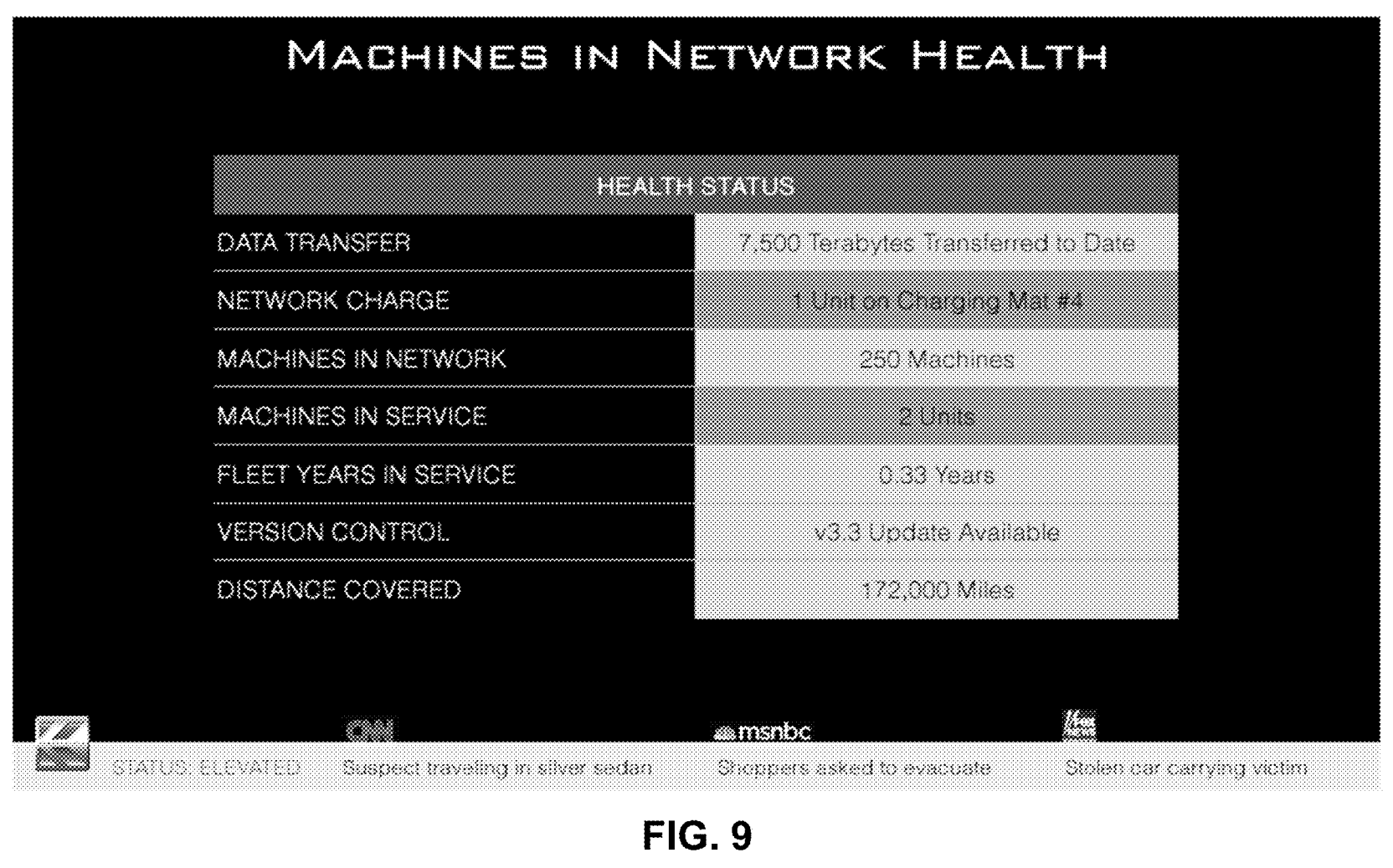

FIG. 9 illustrates a UI for monitoring the status of autonomous data machines. As previously mentioned, the security data systems described herein can be implemented as a part of control center for monitoring and/or directing the activities of autonomous data machines. Accordingly, security analysts may be provided with analytics representative of the current status of the autonomous data machines ("network health status.") For example, the status UI may include information regarding the amount of security data transmitted to the security data system by the data machines, whether any data machines are currently being charged, how many machines are currently connected to the system, how many machines are currently being serviced, the number of years the machines having been in service, version information for the control software implemented by the machines, and/or the total distance covered by the machines.

Figure 10A:
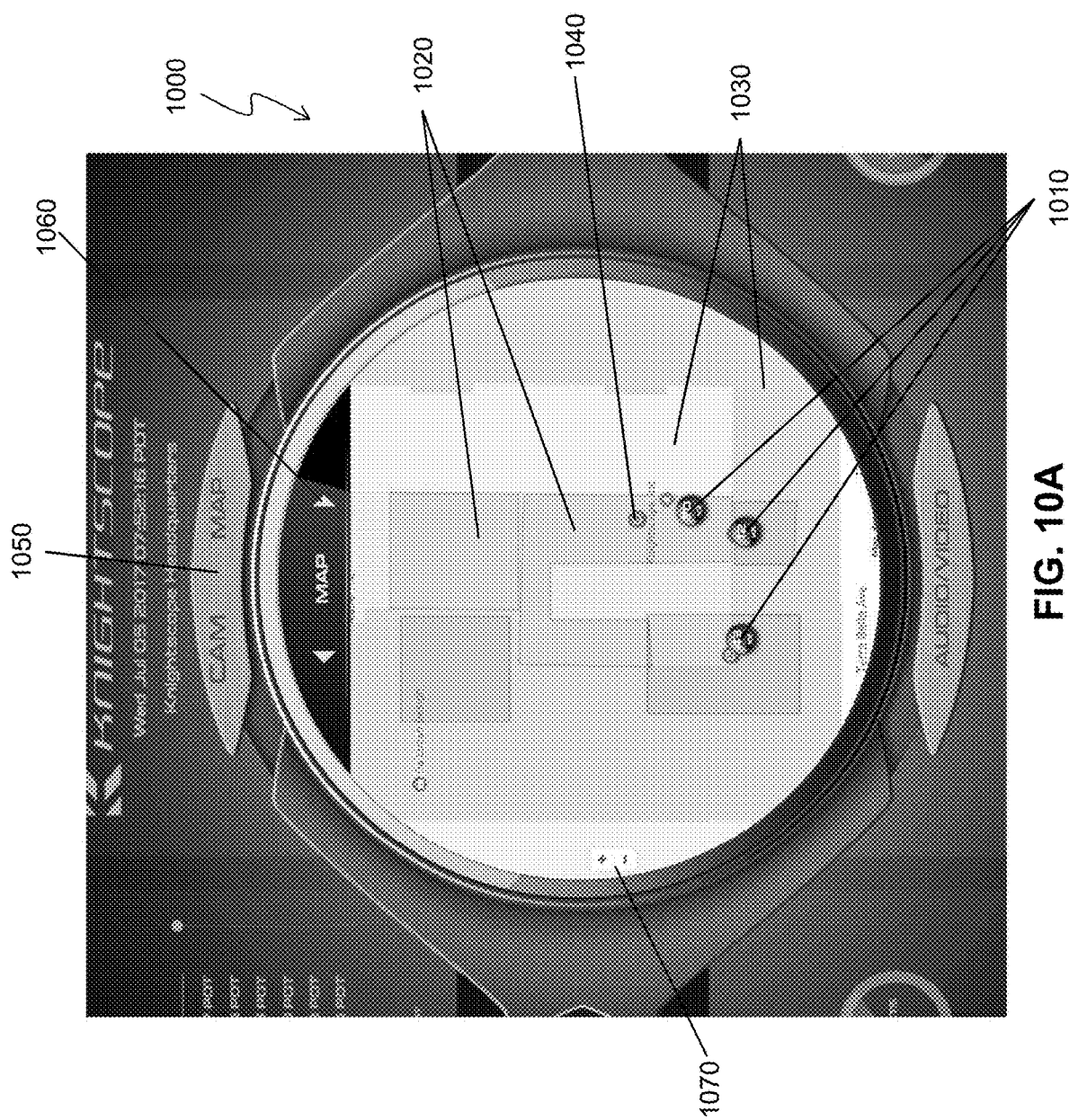
FIG. 10A illustrates a user interface showing a map of a site with one or more autonomous data machines, in accordance with embodiments.

FIG. 10A illustrates a user interface showing a map of a site with one or more autonomous data machines, in accordance with embodiments. Optionally, one or more autonomous data machines may be deployed at a site. In some embodiments, a plurality of autonomous data machines may be deployed at a site.

The map 1000 may show a site with the locations of the one or more autonomous data machines 1010. The autonomous data machines may be displayed as any type of visual marker or icon. The display of the autonomous data machines may include an identifier for each of the autonomous data machines. The identifier may be unique to the autonomous data machine. The display of the autonomous data machines may include an indication of autonomous data machine type. For instance, if different models of autonomous data machine are available, the specific model of the autonomous data machine may be displayed. The map may show the location of the autonomous data machines in substantially real time (e.g., within 15 minutes, within 10 minutes, within 5 minutes, within 3 minutes, within 2 minutes, within 1 minute, within 30 seconds, within 20 seconds, within 10 seconds, within 5 seconds, within 3 seconds, within 2 seconds, within 1 second, within 0.5 seconds, within 0.1 seconds, within 0.05 seconds, within 0.01 seconds, within 0.005 seconds, or 0.001 seconds of real time).

The map may optionally show the location of one or more zones 1020. In some embodiments, a single zone may be provided for a site. Alternatively, multiple zones may be provided at a site. The autonomous data machines may patrol within the zones. An autonomous data machine may be confined to a single zone or may traverse multiple zones. The zones may have various sizes and/or shapes. In some embodiments, a user may specify the sizes and/or shapes of the zones. For instance, an owner, operator, resident of a site may specify the zones for the autonomous data machines to patrol. An administrator or operator of a control center may specify the zones for autonomous data machines to patrol.

The map may show various geographic features 1030 such as buildings, streets, bodies of water, open land, parking structures, or other features. The map may be a two-dimensional top down view of the site. The map of the site may show a map of the outdoors. Optionally, the map of a site may include features that are indoors. For instance, if the site is indoors, the map may include locations of rooms, walls, doors, windows, stairs, and/or ramps.

The map may show the location of one or more charging stations 1040. The autonomous data machines may approach the charging stations to receive electrical power from the charging stations. The charging stations may be substantially stationary or may be mobile. In some instances, the location of the charging stations may be changed. The map may show the up-to-date location of the charging station. The location of the charging station may be updated in substantially real time.

The map may include one or more controls. For instance, a user may switch between a map view and a camera view. One or more controls 1050 may be provided to switch between the map view and the camera view. A user may select on a 'cam' option to view images being collected by a camera of an autonomous data machine. A user may select a 'map' option to view a map view.

Figure 10B:
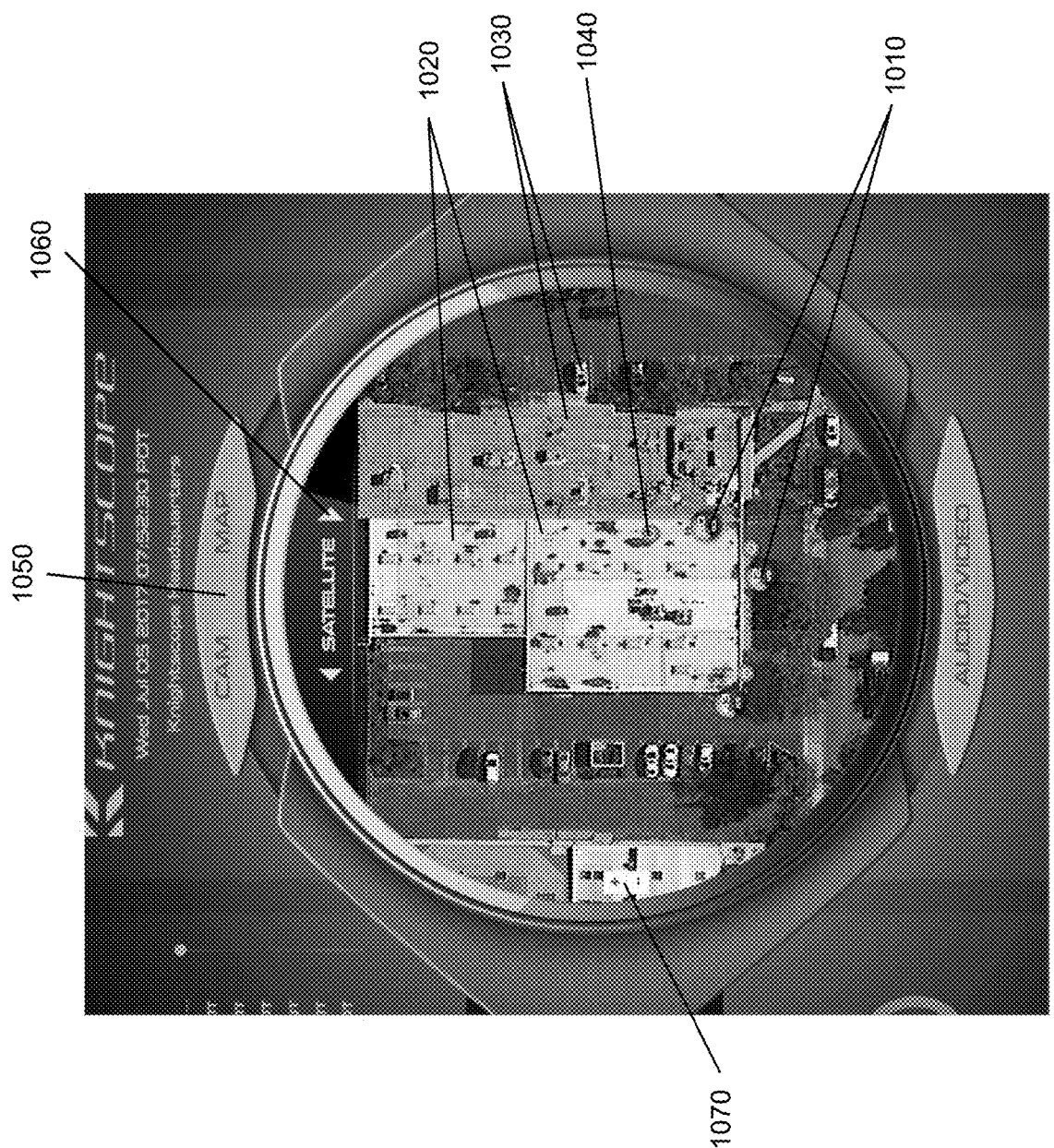
FIG. 10B illustrates a user interface showing a satellite map of a site with one or more autonomous data machines, in accordance with embodiments.

A user may switch between different types of maps. One or more controls 1060 may be provided that may allow a user to switch between different types of maps. For instance, a regular map as illustrated may show representations of the geographic features 1030. A satellite map may show actual satellite images of the site. FIG. 10B illustrates a user interface showing a satellite map of a site with one or more autonomous data machines, in accordance with embodiments. The satellite images may show details such as the presence of vehicles, threes, people, animals, rooftop features, streets, or any other details that may be captured using satellite imagery. The satellite imagery may or may not be updated in substantially real time. In some instances, the satellite imagery may be recent to within several years, a year, month, week, day, hour, minute, or second. In some instances, the controls may show which type of map is being displayed. For instance, the controls may indicate whether a regular 'map' or a 'satellite' map is being displayed.

One or more map controls 1070 may be provided. For instance, the map may include controls for zooming (e.g., zooming in, zooming out) and/or panning. In some instances, a user may interact directly with the map by dragging the map to achieve a desired placement. In some instances, a default view may be provided for the site.

In some embodiments, a map may show only outdoor features. For instance, the map may show the outlines of buildings, streets, lots, parking lots, parks, bodies of water, etc. In some instances, the map may show one or more indoor features. An indoor map view may be provided. A viewer may be able to view the interior of one or more buildings. For instance, the user may be able to engage an indoor map view which may show walls, doors, stairs, elevators, open spaces, or any other interior features. In some instances, the interior features may be labeled. For example, at a shopping mall, the various stores may be labeled on the indoor map.

Figure 11:
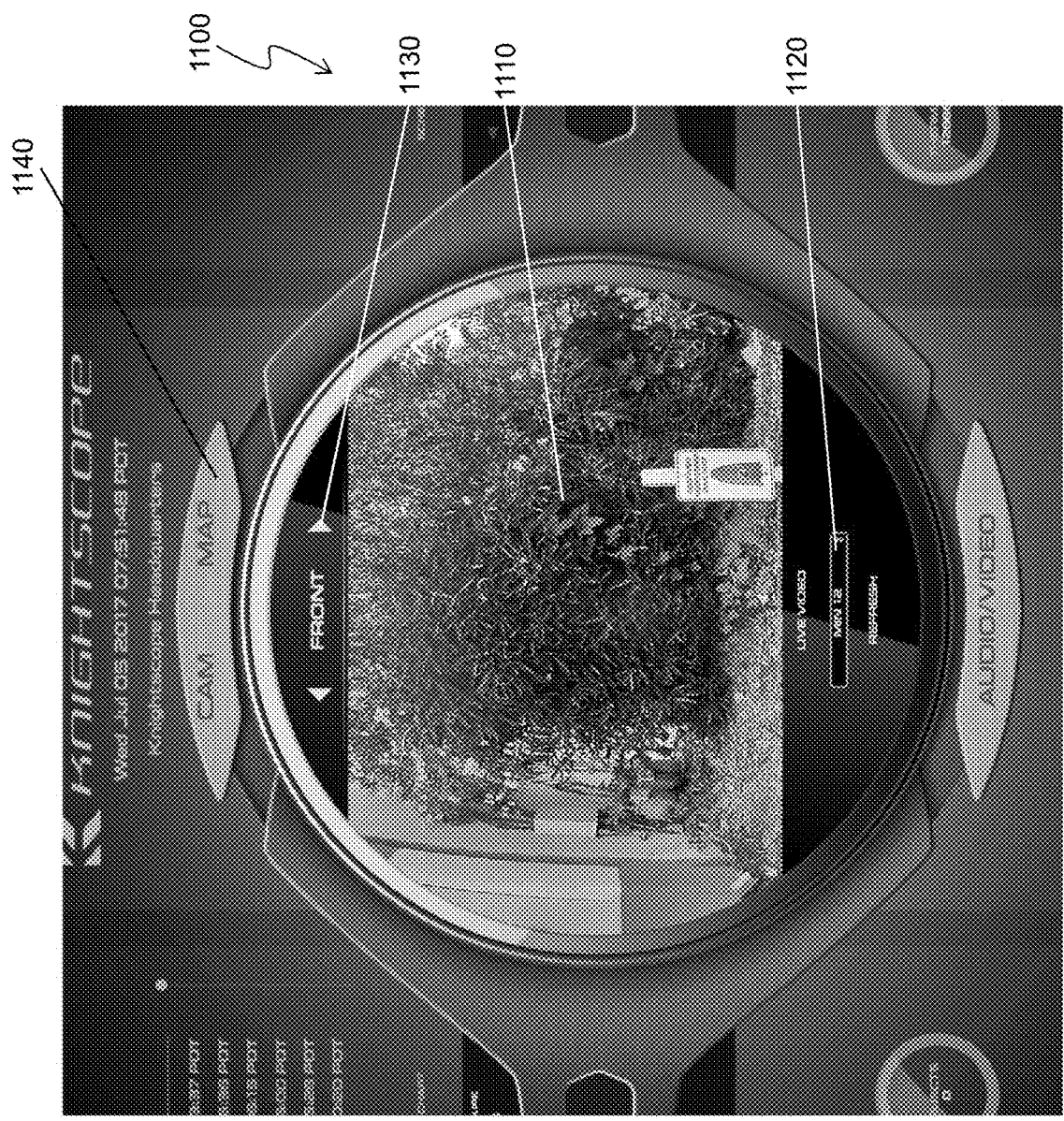
FIG. 11 illustrates a user interface showing an image captured by one or more cameras of an autonomous data machine, in accordance with embodiments.

FIG. 11 illustrates a user interface showing an image captured by one or more cameras of an autonomous data machine, in accordance with embodiments. A camera view 1100 may show an image 1110 captured by an autonomous data machine. The image may be captured and shown live. The image may be shown in substantially real-time of being captured. In alternative embodiments, a user may provide a time input and the image collected at the same time as the time input may be presented.

An indication of which autonomous data machine 1120 is providing the image may be displayed. The indication may comprise an identifier for the autonomous data machine. The identifier may be unique to the autonomous data machine. A user may be able to select a different autonomous data machine from which to view an image. For example, a user may be able to select an autonomous data machine identifier from a drop down menu. Based on which autonomous data machine is selected, the image may be updated to correspond to an image captured by a camera of the selected autonomous data machine.

In some embodiments, an autonomous data machine may comprise a plurality of cameras. The plurality of cameras may have differing fields of view. In some embodiments, the cameras may face different directions from the autonomous data machine. For example, a 'front' camera, a 'right' camera, a 'left camera', and/or a 'rear' camera may be provided. The cameras may point in various directions laterally and/or vertically. In some instances, the cameras on-board the autonomous data machine may collectively have a field of view that is at least 180 degrees, 270 degrees, or 360 degrees around the autonomous data machine. Any number of cameras may be provided. The UI may comprise a set of controls to switch between different cameras 1130. In some instances, an indication of which camera is being utilized may be provided. For instance, when a front camera is being utilized the word 'front' may be provided.

One or more controls 1140 may be provided to switch between the map view and the camera view. A user may select on a 'cam' option to view images being collected by a camera of an autonomous data machine. A user may select a 'map' option to view a map view.

Figure 12:
FIG. 12 illustrates a user interface showing events at a site with one or more autonomous data machines, in accordance with embodiments.

FIG. 12 illustrates a user interface showing events at a site with one or more autonomous data machines, in accordance with embodiments. The events 1200 section may show a listing of events 1210. An example of an event is detecting a person. Other types of events may occur, such as detecting a fire, detecting a collision, detecting a potential crime, or other types of events. The listing of events may include an indication of the type of event and when the corresponding event occurred. The timing information of the event may include a day (e.g., today, four days ago), date (month, day, and/or year), and/or time of day. In some instances, a user may toggle between a list view and a chart view of the events. The events may be shown for a particular site. The events may be shown for a selected site. When a site is selected, a portion of the user interface may show a map for that site and/or provide access to camera data from autonomous data machines at that site.

In some instances, the user interface may show environmental information for a site 1220, such as humidity, temperature, carbon dioxide ($CO2$) levels, and/or pressure.

The user interface may provide access to a detection timeline 1230. In some instances, the detection timeline may comprise one or more characteristics of a timeline as described elsewhere herein. In some embodiments, the detection timeline may show a timeline of the events detected by the system.

Figure 13:
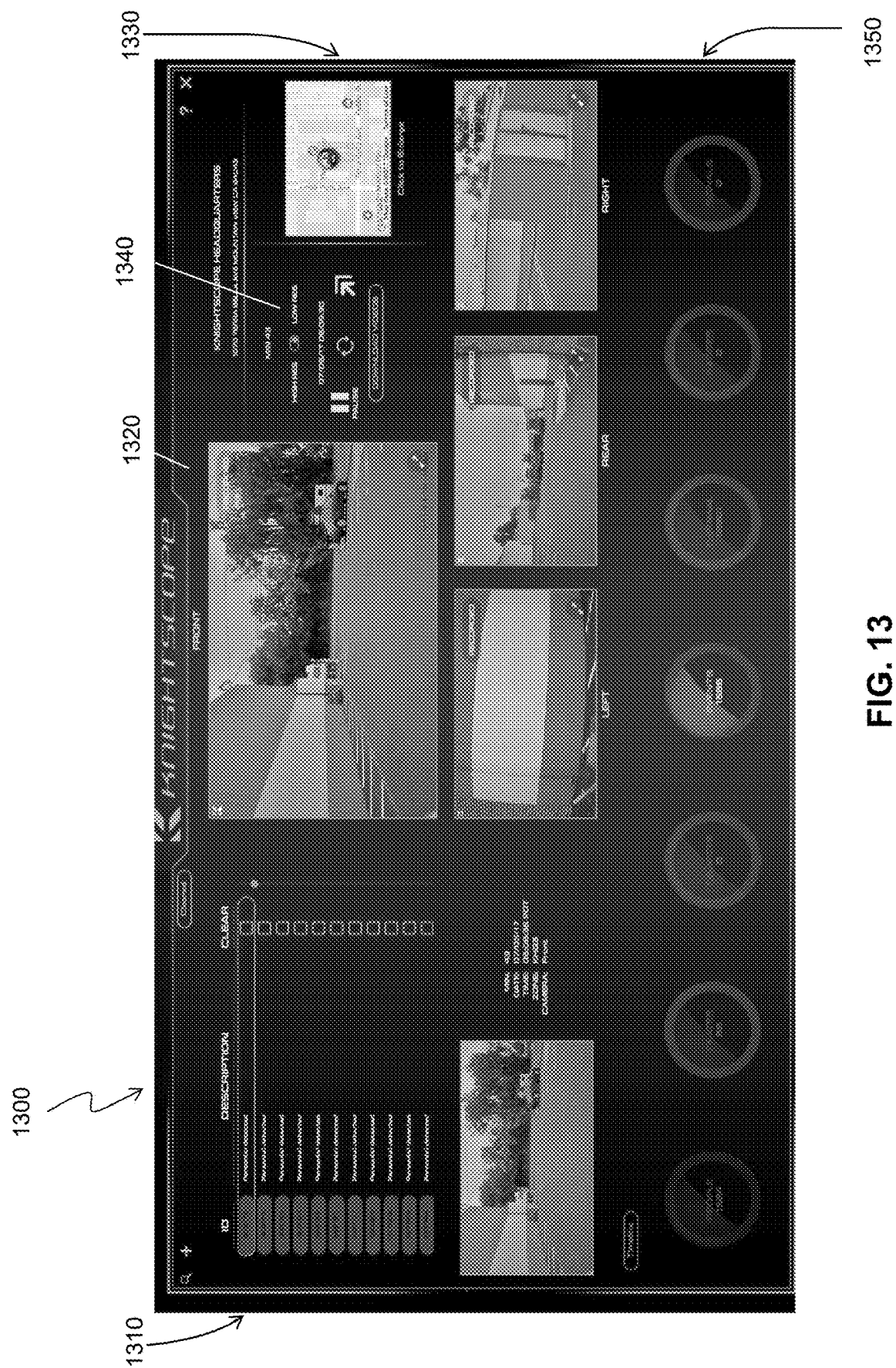
FIG. 13 illustrates a user interface showing an events page, in accordance with embodiments.

FIG. 13 illustrates a user interface showing an events page 1300, in accordance with embodiments. The events page may include a listing of events 1310. The listing of events may have any characteristic as described elsewhere herein. In some instances, an option may be provided for a user to clear an event. An event may remain on the list until it is cleared. A user may choose to view details relating to an event prior to clearing the event. Alternatively, a user may clear an event without reviewing the details.

A user may select an event from a listing of events to view details about the event. When a user has selected an event, data from an autonomous data machine related to the event may be displayed. In some instances, the data from the event may comprise image or video data 1320 from the autonomous data machine at the time of the event. The data from the event may comprise image data of the event itself. For instance, if the event is a person detected, the data may comprise images of the person detected. The data may comprise image or video data from a single camera of the autonomous data machine. Alternatively, the data may comprise image or video data from multiple cameras of the autonomous data machine. Multiple images and/or video data may be displayed simultaneously. For example, data from a front camera, left camera, right camera, and/or rear camera may be displayed simultaneously.

The events page may show a map of a site 1330 where the events are detected. The map of the site may have any characteristics described for a map elsewhere herein. For instance, the map may show the autonomous data machine. The map may show a location where the events provided in the event listing have occurred. The map may optionally show the location of the autonomous data machine at a time at which a selected event has occurred.

Optionally, one or more controls 1340 may be provided. The one or more controls may affect the data about the event that is displayed. For instance, when image data of the event is provided, a user may be able to select between a high resolution image and a low resolution image. The use may pause playback of the image, resume playback, refresh, and/or enlarge/reduce the image. A user may also select an option to download videos and/or images. Any description herein of video may include an audio component to the video.

In some instances, a menu or navigation region 1350 may be provided. The navigation region may indicate to a user which page they are currently viewing. The navigation region may permit a user to navigate between different pages.

Figure 14:
FIG. 14 illustrates a user interface showing audio video information gathered by one or more autonomous data machines, in accordance with embodiments.

FIG. 14 illustrates a user interface showing audio video information gathered by one or more autonomous data machines, in accordance with embodiments. A user may access a user interface 1400 that may permit audio and video playback of data from one or more sensors on-board an autonomous data machine.

A user may be able to view data relating to an autonomous data machine. Optionally, a list and/or chart of events 1410 may be displayed on the user interface. The list or chart may have any characteristics as described elsewhere herein for a listing of events. A user may select whether a list view or chart view is presented for the events.

One or more sets of data 1420, 1422 from the autonomous data machine may be displayed. The one or more sets of data may comprise security data. The data may be collected with aid of one or more sensors on-board the autonomous data machine. For example, the one or more sensors may comprise cameras that may capture images of one or more regions surrounding the autonomous data machine. In one example, multiple cameras may be present on an autonomous data machine and may show different fields of view. For example, cameras may capture a front image, right image, left image, and/or rear image around the autonomous data machine. The cameras may capture streaming video and/or still images. Audio data may be captured around the autonomous data machine. Any other types of sensors, such as those described elsewhere herein, may be used to capture data around the autonomous data machine. Such data may be displayed in any form, e.g., visual form, chart form, numerical form, or qualitative form. In some instances, by default, the data shown may be data that is live. The live data may be data that in shown in substantially real-time of being collected.

A map of a site 1430 where the events are detected may be provided. The map of the site may have any characteristics described for a map elsewhere herein. For instance, the map may show the autonomous data machine. The map may show a location where the events provided in the event listing or chart have occurred. The map may optionally show the location of the autonomous data machine at a time at which a selected event has occurred. The map may optionally show the location of the autonomous data machine at a time that is selected on a playback bar. The map may show the location of any number of autonomous data machines present at the site. The map may show the location of any number of autonomous data machines present at a selected time, such as a time at which a selected event has occurred, or a time that is selected on a playback bar.

A playback bar 1440 may be displayed on the user interface. The playback bar may be displayed simultaneously with the list and/or chart of events, the one or more sets of data, and/or the map of the site. The playback bar may be positioned below a list and/or chart of events, the one or more sets of data, and/or the map of the site. The playback bar may show a visual representation of a timeline. The playback bar may be displayed with a horizontal orientation, or a vertical orientation. The playback bar may have one or more demarcations of time 1442. The demarcations of time may have any order of magnitude. For example, the demarcation of time may be on the order of years, quarters, months, weeks, days, hours, minutes, or seconds. In one example, the demarcations of time may be on the order of days, and the labels for the demarcations of time may show the corresponding date on the playback bar. In another example, the demarcations of time may be on the order of minutes and the labels for the demarcations may show the hour and minute of the day on the playback bar (e.g., 8:02, 8:03, 8:04, etc.).

A thumbnail 1440 may be visible on or in close proximity to the playback bar. For instance, the thumbnail may be directly on the playback bar, or may be shown slightly above, below, to the right, or to the left of the playback bar. The thumbnail may or may not cover a portion of the playback bar. The thumbnail may show some form of data collected by the autonomous data machine. In some instances, the thumbnail may show security data collected by one or more sensors of the autonomous data machine. The thumbnail may show a visual image captured by one or more sensors of the autonomous data machine. The data shown in the thumbnail may correspond to the one or more data sets 1420 that may be displayed. The thumbnail may show the data collected by the autonomous data machine at a time corresponding to the time on the playback bar that the thumbnail is positioned. For example, the thumbnail may show an image that is captured by a camera of the autonomous data machine at the time location (e.g., 8:03:55 AM) that the thumbnail is positioned (e.g., between demarcations 8:03 AM and 8:04 AM). The thumbnail may show further details about the time corresponding to the shown data. For instance, the details of the time may be more detailed than the demarcations of time. For example, if the demarcations are shown on the order of minutes, the details of time may include the date, hour, minutes, and/or seconds at which the data shown on the thumbnail is captured. A user may click on the playback bar, or select a portion of the playback bar in any other manner to position the thumbnail. In some instances, the thumbnail may be dragged along the playback bar to correspond to different points in time. The data and/or details of time shown on the thumbnail may be updated to correspond to the time on the playback bar that the thumbnail is positioned. The data and/or details of time may be substantially updated in real-time on the thumbnail so that they change as the thumbnail slides along the playback bar. If the user is not interacting with the thumbnail at a given point in time, the thumbnail may move as the data is played back. For instance, if a user initially dragged the thumbnail to 8:03 AM, the thumbnail may progress from 8:03 so that one minute later, it is at 8:04, two minutes later, it is at 8:05 and so forth. The data on the thumbnail may be updated in real-time.

In some embodiments, when the playback bar is utilized, the one or more sets of data 1420, 1422 shown on the user interface may correspond to the time of the thumbnail 1444 on the playback bar. For example, if the thumbnail dragged to 8:03 AM, the one or more sets of data may show corresponding security data from 8:03 AM. The data shown in the thumbnail may match at least one of the sets of data 1420. The data being displayed on the timeline and data shown in the one or more sets of data may both correspond to the same time, which may be the time on the playback bar that the thumbnail is positioned. In some instances, a plurality of sets of data may be displayed. For example, the plurality of sets of data may correspond to data collected by different sensors. For example, the data may be from different cameras. The thumbnail may optionally show a single set of data at a time, or may show multiple sets of data simultaneously. In one example, a user may toggle between different sets of data that may be shown on the thumbnail. For example, the sets of data may correspond to data collected by different cameras (e.g., front camera, rear camera, right camera, left camera). The thumbnail may default to showing data from the front camera. The user may toggle between different cameras, so that the user can direct the thumbnail to show the view from the front camera, rear camera, right camera, or left camera. Showing data on the thumbnail may advantageously permit a user to get a quick glimpse of the data as the user navigates along the playback bar. This may be helpful when the user is looking for something in particular, and may help the user isolate a time at which an event occurred. For example, if the user is looking for an image of a blue pickup truck, the user may move the thumbnail over the playback bar and view the data shown on the thumbnail for a blue truck. When the user sees the blue truck, the user may slow down the scanning, and allow the thumbnail to move naturally along the playback bar as the video plays. The user may be able to switch between the different data views on the thumbnail bar and move the thumbnail along the playback bar, since the particular object or event that the person is looking for may show up on any of the sensors (e.g., cameras) of the autonomous data machine.

The playback bar may optionally include one or more navigation tools 1446 which may allow the user to adjust the playback bar. For instance, the playback bar may be presented for a period of time. If the user wishes to change the period of time for the displayed playback bar, the user may use the navigation tools. For instance, the user may move backwards in time, forwards in time, or may change the level of granularity of time displayed. For example, the user may make the playback bar cover a wider range of time, which may provide less granularity (e.g., bigger gaps between the demarcations of time), or may permit the playback bar to cover a more narrow range of time but provide more granularity (e.g., smaller gaps between the demarcations of time).

The user interface may also include one or more machine controls 1450. The one or more machine controls may allow a user to control an autonomous data machine. The user may control the autonomous data machine remotely with aid of the machine controls. Examples of machine controls may include options to allow the autonomous data machine to patrol, or stop (e.g., remain stationary). The controls may include an option to hear the sound collected by the autonomous data machine, or mute the sound. The controls may provide an option to turn on an alarm or mute the alarm. A broadcast option may allow a user to remotely broadcast information (e.g., audio) over one or more autonomous data machines. In some instances, a user may speak, and the user's voice may be heard over the one or more autonomous data machines. Optionally, a text-to-speech option may be presented. A user may type a message that may be broadcast via the audio system of one or more autonomous data machines. In some instances, a speech-to-text option may be presented. A user may speak a message that may show up as text on one or more autonomous data machines. An intercom option may allow two way communications between a user and another individual that may be present at the autonomous data machine location. For instance, a user may speak and be heard by the individual via one or more speakers of the autonomous data machine, and an individual may speak, which may be picked up by one or more microphones of the autonomous data machine and may be heard by the remote user. In some instances, text-to-speed may be used for two-way communication. For instance, the user may type a message that may be heard by the individual. Alternatively or in addition, the individual may type a message that may be heard by the user. In some instances a speech-to-text option may be presented. A user may speak a message that may be displayed as text on the autonomous data machine. Alternatively or in addition, an individual may speak a message that may be displayed as text at a control center that may be viewable by the user. An option for live audio may be presented which may allow a user to hear audio data collected by the autonomous data machine in real time.

The user interface may include one or more video controls 1460. A user may be able to switch between a high resolution and low resolution image. The high and/or low resolution image may be displayed as the one or more sets of data. In some instances, the default may be for an autonomous data machine to send low resolution data (e.g., image). High resolution data, which may require more bandwidth, may be sent on request. In some instances, a default may be for an autonomous data machine to store high resolution data locally for a period of time. The high resolution data may be transmitted to the remote user if requested. The high resolution data may be deleted after the period of time. Another example of a video control may include a selection of time level (e.g., between years, months, weeks, days, hours, minutes, seconds, or less). A user may have an option to pause the playback, play the playback, or view live data. A user may have an option to make clips or view clips. In some instances, a user may select one or more portions of a playback bar to create a clip. For example, a user may select a time period from 8:03-8:05 for a clip. One or more clips may be saved. The user may view clips that have already been created.

The audio and video interface comprising a playback bar may be applied with any of the other pages described elsewhere herein. For instance, a user may select an event from an events page, and use a playback bar to view details relating to the event. The audio and video interface may be navigated to from any of the other pages described elsewhere herein.

Figure 15:
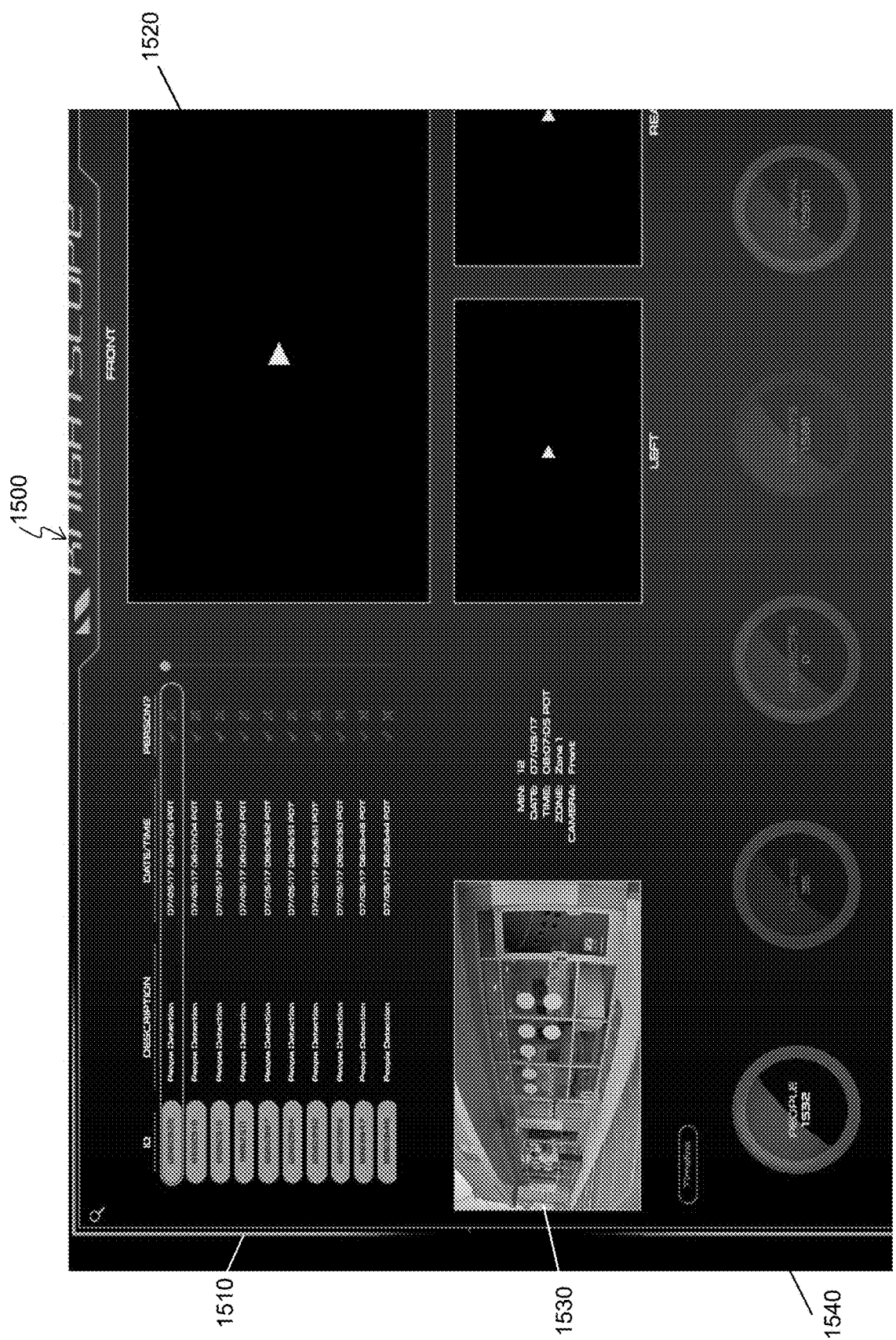
FIG. 15 illustrates a user interface showing a people detection page, in accordance with embodiments.

FIG. 15 illustrates a user interface showing a people detection page 1500, in accordance with embodiments. The people detection page may include a listing of people detections 1510. The listing of people detections may have any characteristic as described elsewhere herein for events. For instance, the listing of people may include an id of a detection event, a description of the detection event, a date/time at which a detection event occurred and/or an option to confirm the person. In some instances, an option may be provided for a user to confirm whether the detection was really a person or not. An event may remain on the list until a user confirms whether the detection was a person. A user may choose to view details relating to a person detection prior to confirming whether the detected object really is a person. Alternatively, a user may confirm a person without reviewing the details.

A user may select a person detection event from a listing of person detections to view details about the person detection event. When a user has selected a person detection event, data from an autonomous data machine related to the event may be displayed. In some instances, the data from the event may comprise image or video data 1520 from the autonomous data machine at the time of the person detection event. The data from the event may comprise image data of the person detection event itself. For instance, if a person detected, the data may comprise images of the person detected. The data may comprise image or video data from a single camera of the autonomous data machine. Alternatively, the data may comprise image or video data from multiple cameras of the autonomous data machine. Multiple images and/or video data may be displayed simultaneously. For example, data from a front camera, left camera, right camera, and/or rear camera may be displayed simultaneously. Optionally, one or more still images 1530 of the detected person may be displayed. The still images may or may not be simultaneously displayed with the video data. Details of the person detection event may be displayed, such as an identifier for an autonomous data machine that detected the person, date of person detection, time of person detection, zone at which the detection occurred, and/or the camera of the autonomous data machine that detected the person. This may correspond to the still image of the detected person. The image of the detected person may include a box around the image of the person. The image of the detected person may include any other visual enhancement (e.g., highlighting, colors, arrows, etc.) that may draw a viewer's attention to the detected person.

The person detection page may or may not show a map of a site where the person detection events are occurring. The map of the site may have any characteristics described for a map elsewhere herein. For instance, the map may show the autonomous data machine. The map may show a location where the person detection events provided in the listing have occurred. The map may optionally show the location of the autonomous data machine at a time at which a selected event has occurred.

Optionally, one or more controls may be provided. The one or more controls may affect the data about the event that is displayed. For instance, when image data of the event is provided, a user may be able to select between a high resolution image and a low resolution image. The use may pause playback of the image, resume playback, refresh, and/or enlarge/reduce the image. A user may also select an option to download videos and/or images. Any description herein of video may include an audio component to the video.

An option may be presented for a user to view a timeline. The user may be navigated to a timeline page. A timeline may have any characteristics as described elsewhere herein.

In some instances, a menu or navigation region 1540 may be provided. The navigation region may indicate to a user which page they are currently viewing. The navigation region may permit a user to navigate between different pages.

Figure 16:
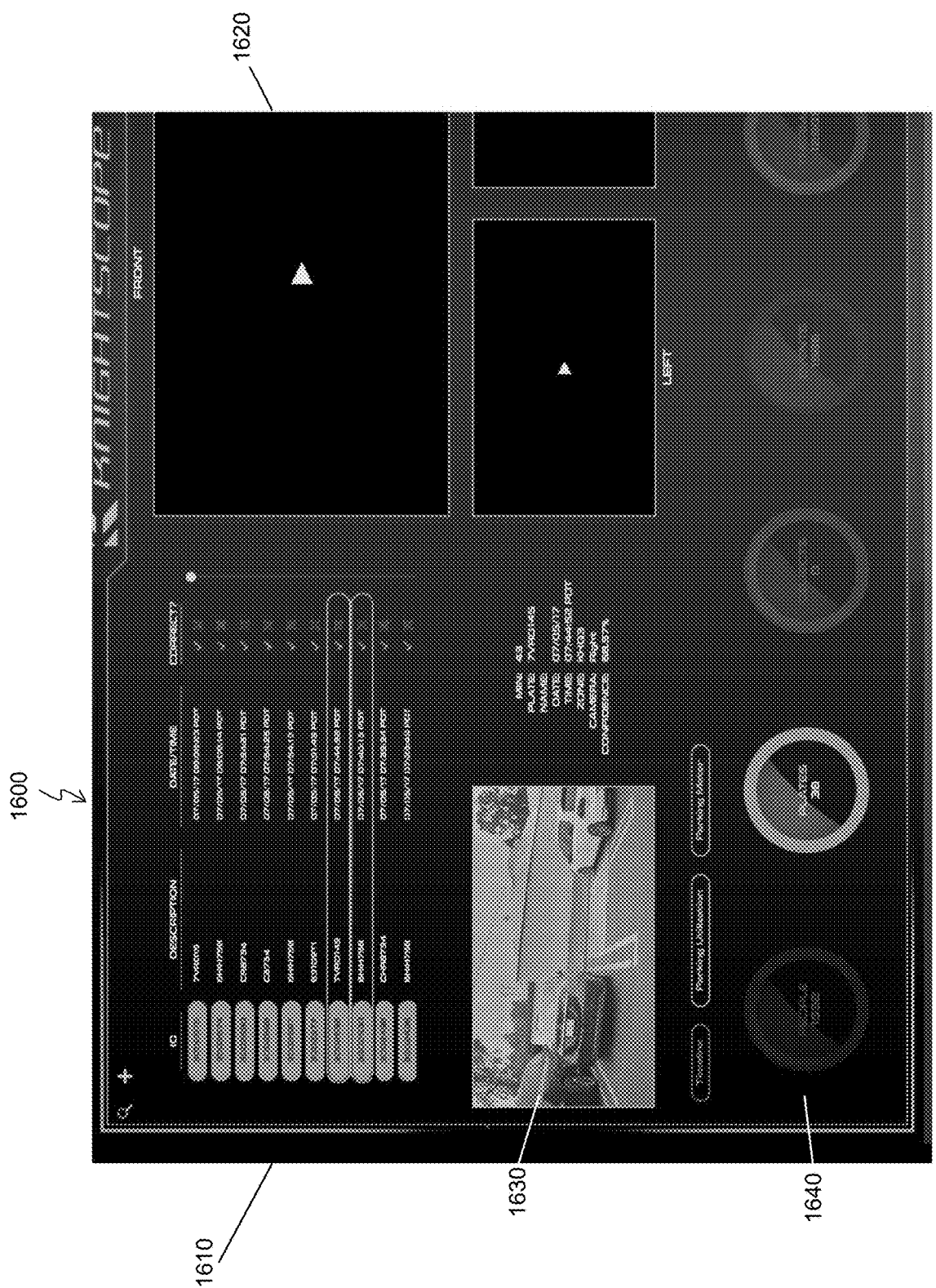
FIG. 16 illustrates a user interface showing a license plate detection page, in accordance with embodiments.

FIG. 16 illustrates a user interface showing a license plate detection page 1600, in accordance with embodiments. The license plate detection page may include a listing of license plate detections 1610. The listing of license plate detections may have any characteristic as described elsewhere herein for events. For instance, the listing of license plate detections may include an id of a detection event, a description of the detection event (e.g., license plate number), a date/time at which a detection event occurred and/or an option to confirm whether the detection and/or license plate information is correct. In some instances, an option may be provided for a user to confirm whether the detection and/or license plate information is correct. An event may remain on the list until a user confirms whether the detection and/or license plate information. A user may choose to view details relating to a license plate detection prior to confirming whether the detected and/or license plate information is correct. Alternatively, a user may confirm a detection and/or license plate information without reviewing the details.

A user may select a license plate detection event from a listing of license plate detections to view details about the license plate detection event. When a user has selected a license plate detection event, data from an autonomous data machine related to the event may be displayed. In some instances, the data from the event may comprise image or video data 1620 from the autonomous data machine at the time of the license plate detection event. The data from the event may comprise image data of the license plate detection event itself. For instance, if a license plate is detected, the data may comprise images of the license plate detected and/or the corresponding vehicle. The data may comprise image or video data from a single camera of the autonomous data machine. Alternatively, the data may comprise image or video data from multiple cameras of the autonomous data machine. Multiple images and/or video data may be displayed simultaneously. For example, data from a front camera, left camera, right camera, and/or rear camera may be displayed simultaneously. Optionally, one or more still images 1630 of the detected license plate may be displayed. The still images may or may not be simultaneously displayed with the video data. Details of the license plate detection event may be displayed, such as an identifier for an autonomous data machine that detected the license plate, license plate number and/or state/country, date of license plate detection, time of license plate detection, zone at which the detection occurred, the camera of the autonomous data machine that detected the license plate, and/or confidence level. This may correspond to the still image of the detected license plate. The image of the detected license plate may include a box around the image of the license plate. The image of the detected license plate may include any other visual enhancement (e.g., highlighting, colors, arrows, etc.) that may draw a viewer's attention to the detected license plate.

The license plate detection page may or may not show a map of a site where the license plate detection events are occurring. The map of the site may have any characteristics described for a map elsewhere herein. For instance, the map may show the autonomous data machine. The map may show a location where the license plate detection events provided in the listing have occurred. The map may optionally show the location of the autonomous data machine at a time at which a selected event has occurred.

Optionally, one or more controls may be provided. The one or more controls may affect the data about the event that is displayed. For instance, when image data of the license plate event is provided, a user may be able to select between a high resolution image and a low resolution image. The use may pause playback of the image, resume playback, refresh, and/or enlarge/reduce the image. A user may also select an option to download videos and/or images. Any description herein of video may include an audio component to the video.

An option may be presented for a user to view a timeline. The user may be navigated to a timeline page. A timeline may have any characteristics as described elsewhere herein. An option may be presented for a user to view details relating to parking utilization or a parking meter. A parking utilization page and/or a parking meter page may have one or more characteristics, as described in U.S. patent application Ser. No. 15/691,670, filed Aug. 30, 2017, the contents of which are incorporated by reference in their entirety.

In some instances, a menu or navigation region 1640 may be provided. The navigation region may indicate to a user which page they are currently viewing. The navigation region may permit a user to navigate between different pages.

Figure 17:
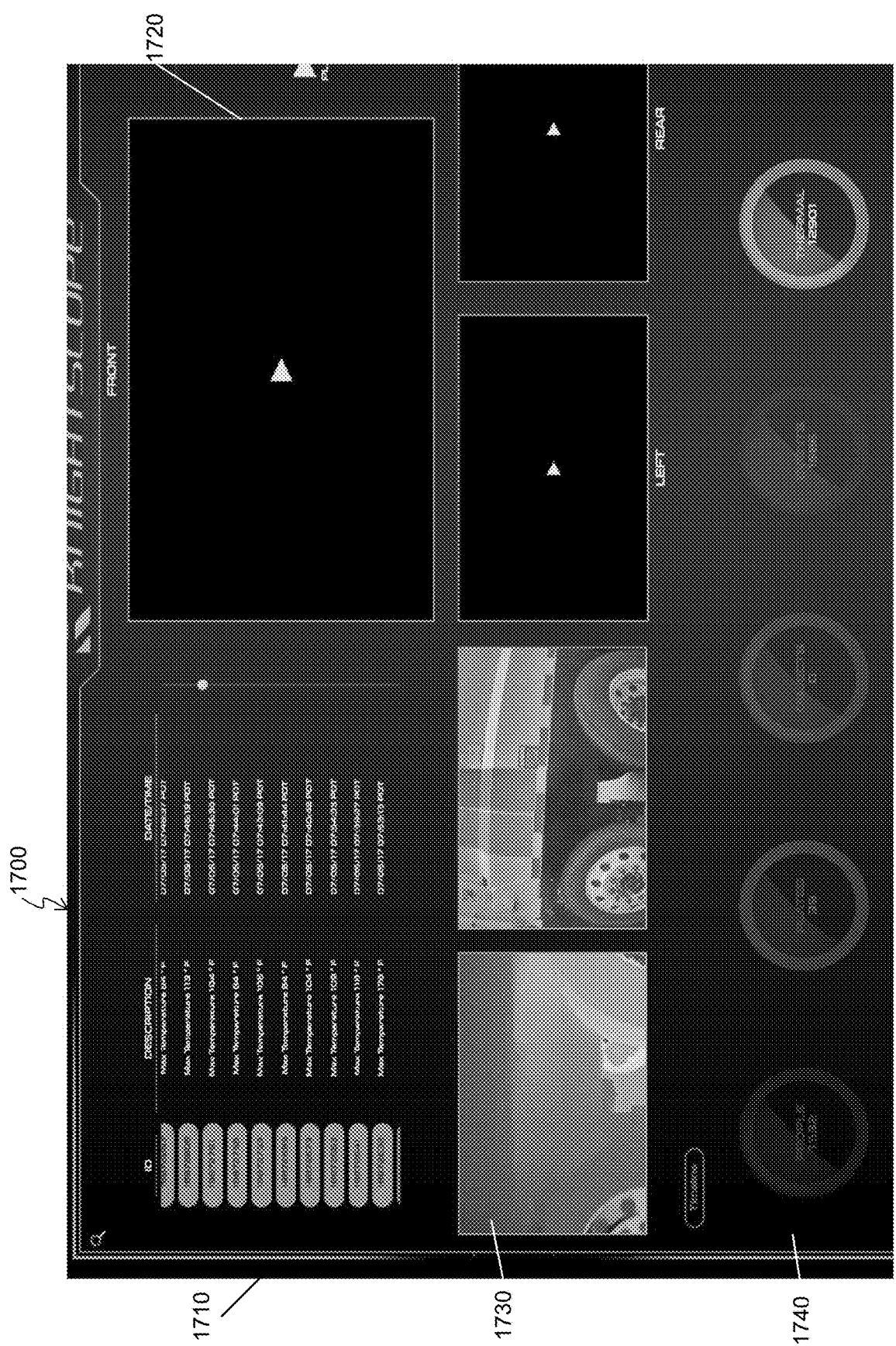
FIG. 17 illustrates a user interface showing thermal data captured by one or more autonomous data machines, in accordance with embodiments.

FIG. 17 illustrates a user interface showing thermal data 1700 captured by one or more autonomous data machines, in accordance with embodiments. The thermal page may include a listing of temperature event detections 1710. The listing of thermal event detections may have any characteristic as described elsewhere herein for events. For instance, the listing of thermal events may include an id of a thermal event, a description of the thermal events (e.g., max temperature, min temperature, etc.), a date/time at which a detection event occurred and/or an option to confirm the thermal events. In some instances, an option may be provided for a user to confirm whether the thermal event was a notable event. In some instances a thermal event may remain on a list for a threshold period of time. Optionally, an event may remain on the list until a user confirms whether the thermal detection was a notable event or not. A user may choose to view details relating to a thermal event prior to confirming whether the detected thermal events really are notable events (e.g., fire, explosion, etc.). Alternatively, a user may confirm a thermal event without reviewing the details.

A user may select a thermal event from a listing of thermal events to view details about the thermal event. When a user has selected a thermal event, data from an autonomous data machine related to the event may be displayed. In some instances, the data from the event may comprise image or video data 1720 from the autonomous data machine at the time of the thermal event. The image or video data may include regular visual images and/or thermal images. The data from the event may comprise image data of the thermal event itself. For instance, if a thermal event is detected, the data may comprise images of the thermal event. The data may comprise image or video data from a single camera (e.g., visual camera or thermal camera) of the autonomous data machine. Alternatively, the data may comprise image or video data from multiple cameras of the autonomous data machine. The multiple cameras may be the same type of camera (e.g., all visual or all thermal cameras) or a mixture of multiple types of cameras (e.g., some visual and some thermal cameras). Multiple images and/or video data may be displayed simultaneously. For example, data from a front camera, left camera, right camera, and/or rear camera may be displayed simultaneously. Optionally, one or more still images 1730 of the detected thermal event may be displayed. The still images may or may not be simultaneously displayed with the video data. In some instances, both the still and video image data may be visual images. Optionally, the still images may be thermal images and the video data may be visual images. Alternatively, the still images may be visual images and the video data may be thermal images, or both the still images and the video data may comprise thermal images. Details of the thermal event may or may not be displayed, such as an identifier for an autonomous data machine that detected the thermal event, date of thermal event, time of thermal event, zone at which the thermal event occurred, and/or the camera of the autonomous data machine that detected the person. This may correspond to the still image of the detected thermal event. Optionally, the image of the detected thermal event may include a box around the notable thermal event. The image of the thermal event may include any other visual enhancement (e.g., highlighting, colors, arrows, etc.) that may draw a viewer's attention to the thermal event.

The thermal event detection page may or may not show a map of a site where the thermal event detection events are occurring. The map of the site may have any characteristics described for a map elsewhere herein. For instance, the map may show the autonomous data machine. The map may show a location where the thermal event detection events provided in the listing have occurred. The map may optionally show the location of the autonomous data machine at a time at which a selected event has occurred.

Optionally, one or more controls may be provided. The one or more controls may affect the data about the event that is displayed. For instance, when image data of the event is provided, a user may be able to select between a high resolution image and a low resolution image (for visual and/or thermal images). The use may pause playback of the image, resume playback, refresh, and/or enlarge/reduce the image. A user may also select an option to download videos and/or images. Any description herein of video may include an audio component to the video.

An option may be presented for a user to view a timeline. The user may be navigated to a timeline page. A timeline may have any characteristics as described elsewhere herein.

In some instances, a menu or navigation region 1740 may be provided. The navigation region may indicate to a user which page they are currently viewing. The navigation region may permit a user to navigate between different pages.

Figure 18:
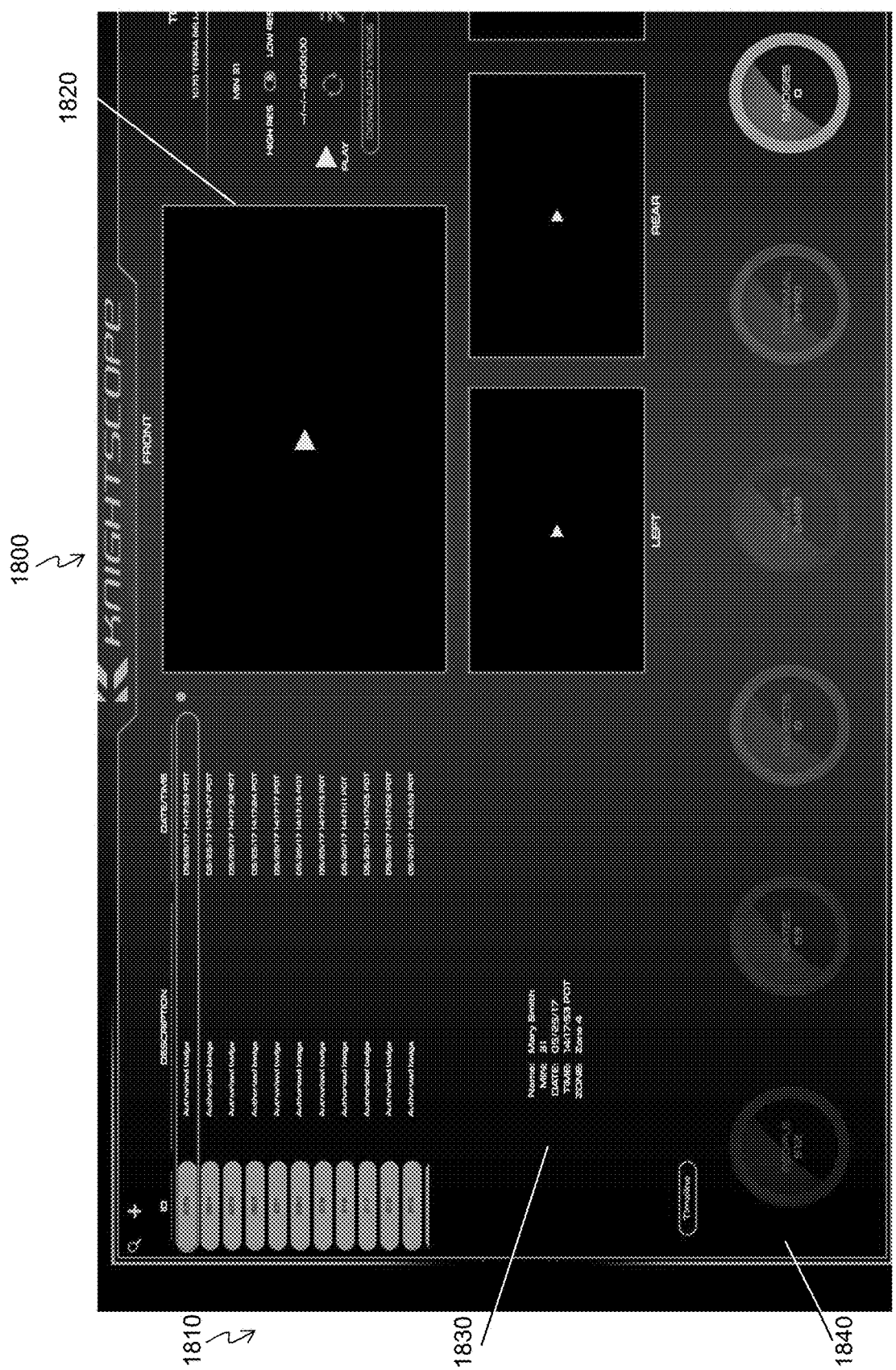
FIG. 18 illustrates a user interface showing badge information captured by one or more autonomous data machines, in accordance with embodiments.

FIG. 18 illustrates a user interface showing badge information 1800 captured by one or more autonomous data machines, in accordance with embodiments. In some embodiments, it may be useful for individuals to show a badge to one or more autonomous data machines. In some instances an autonomous data machine may request for an individual to show a badge to the autonomous data machine. In some instances, an autonomous data machine may view the badge to determine whether the individual is authorized to be at a particular location. If an individual does not have a badge, the autonomous data machine may be able to guide the individual to a location where a user can get a badge, or receive a temporary visitor's badge. The autonomous data machine may provide an alert if an unauthorized individual is located in a restricted area. If an individual does not show a badge upon request, the autonomous data machine may provide an alert. The badge information may be provided on an ad hoc basis based on demand by the autonomous data machine.

In some instances, employees or visitors at particular sites may need to 'swipe in' and/or 'swipe out' for records of the site. This may be useful for keeping track of the presence of employees and/or visitors. This may be useful for keeping track of data, such as how long an individual was at a workplace, what areas the user may have accessed, and so forth. In some instances, individuals (such as employees or visitors) may show an autonomous data machine the individual's badge to 'swipe in' or 'swipe out'. The individual may be holding or wearing the badge when the user shows the badge to the autonomous data machine. The autonomous data machine may detect the badge with aid of one or more sensors. For instance, visual sensors may be used to capture images of the badge and/or individual holding or wearing the badge. Other sensors may be used to recognize and/or identify the badge. For instance, the badge may have an RFID chip and the autonomous data machine may have an RFID reader. The badge may send out a wireless signal that may be recognized by a wireless receiver of the autonomous data machine. Any other type of sensor on-board the autonomous data machine may be used to recognize and/or identify the badge.

Optionally, it may be useful for the autonomous data machine to collect data about the individual holding and/or wearing the badge along with the badge. For instance, an image of the badge and/or the individual with the badge may be captured. This may allow users to later review the images and determine whether the individual with the badge is actually the individual associated with the badge. This may allow for detection of individuals who may have stolen or borrowed the badge from someone else.

The badge information page may include a listing of badge detections 1810. The listing of badge detections may have any characteristic as described elsewhere herein for events. For instance, the listing of badge detections may include an id of a badge detection, a description of the badge (e.g., type of badge—authorized vs. unauthorized, level of access granted by the badge, and/or identifying information about the badge or individual associated with the badge), a date/time at which a badge detection occurred and/or an option to confirm the badge detection. In some instances, an option may be provided for a user to confirm whether the badge detection was correct. In some instances a badge detection may remain on a list for a threshold period of time. Optionally, badge detection may remain on the list until a user confirms whether the badge detection was a notable event or not. A user may choose to view details relating to a badge detection prior to confirming whether the badge detection is really correct or not. Alternatively, a user may confirm a badge detection without reviewing the details.

A user may select a badge detection from a listing of badge detections to view details about the badge detection event. When a user has selected a badge detection event, data from an autonomous data machine related to the event may be displayed. In some instances, the data from the event may comprise image or video data 1820 from the autonomous data machine at the time of the badge detection event. The data from the event may comprise image data of the badge detection event itself. For instance, if a badge is detected, the data may comprise images of the badge detected and/or the person that is holding or wearing the badge. The data may comprise image or video data from a single camera of the autonomous data machine. Alternatively, the data may comprise image or video data from multiple cameras of the autonomous data machine. Multiple images and/or video data may be displayed simultaneously. For example, data from a front camera, left camera, right camera, and/or rear camera may be displayed simultaneously. Optionally, one or more still images of the detected badge and/or person holding or wearing the badge may be displayed. The still images may or may not be simultaneously displayed with the video data. Details of the badge detection event 1830 may be displayed, such as a name of an individual associated with the badge, an identifier for an autonomous data machine that detected the badge, date of badge detection, time of badge detection, zone at which the detection occurred, and/or the camera of the autonomous data machine that detected the badge. Optionally an identifier for a badge (e.g., badge id number, employee id number, etc.) may be displayed. This may correspond to the still image of the detected badge. The image of the detected badge may include a box around the image of the badge. The image of the detected badge may or may not include any other visual enhancement (e.g., highlighting, colors, arrows, etc.) that may draw a viewer's attention to the detected person.

The badge detection page may or may not show a map of a site where the badge detection events are occurring. The map of the site may have any characteristics described for a map elsewhere herein. For instance, the map may show the autonomous data machine. The map may show a location where the badge detection events provided in the listing have occurred. The map may optionally show the location of the autonomous data machine at a time at which a selected event has occurred.

Optionally, one or more controls may be provided. The one or more controls may affect the data about the event that is displayed. For instance, when image data of the event is provided, a user may be able to select between a high resolution image and a low resolution image. The use may pause playback of the image, resume playback, refresh, and/or enlarge/reduce the image. A user may also select an option to download videos and/or images. Any description herein of video may include an audio component to the video.

An option may be presented for a user to view a timeline. The user may be navigated to a timeline page. A timeline may have any characteristics as described elsewhere herein.

In some instances, a menu or navigation region 1840 may be provided. The navigation region may indicate to a user which page they are currently viewing. The navigation region may permit a user to navigate between different pages.

Figure 19:
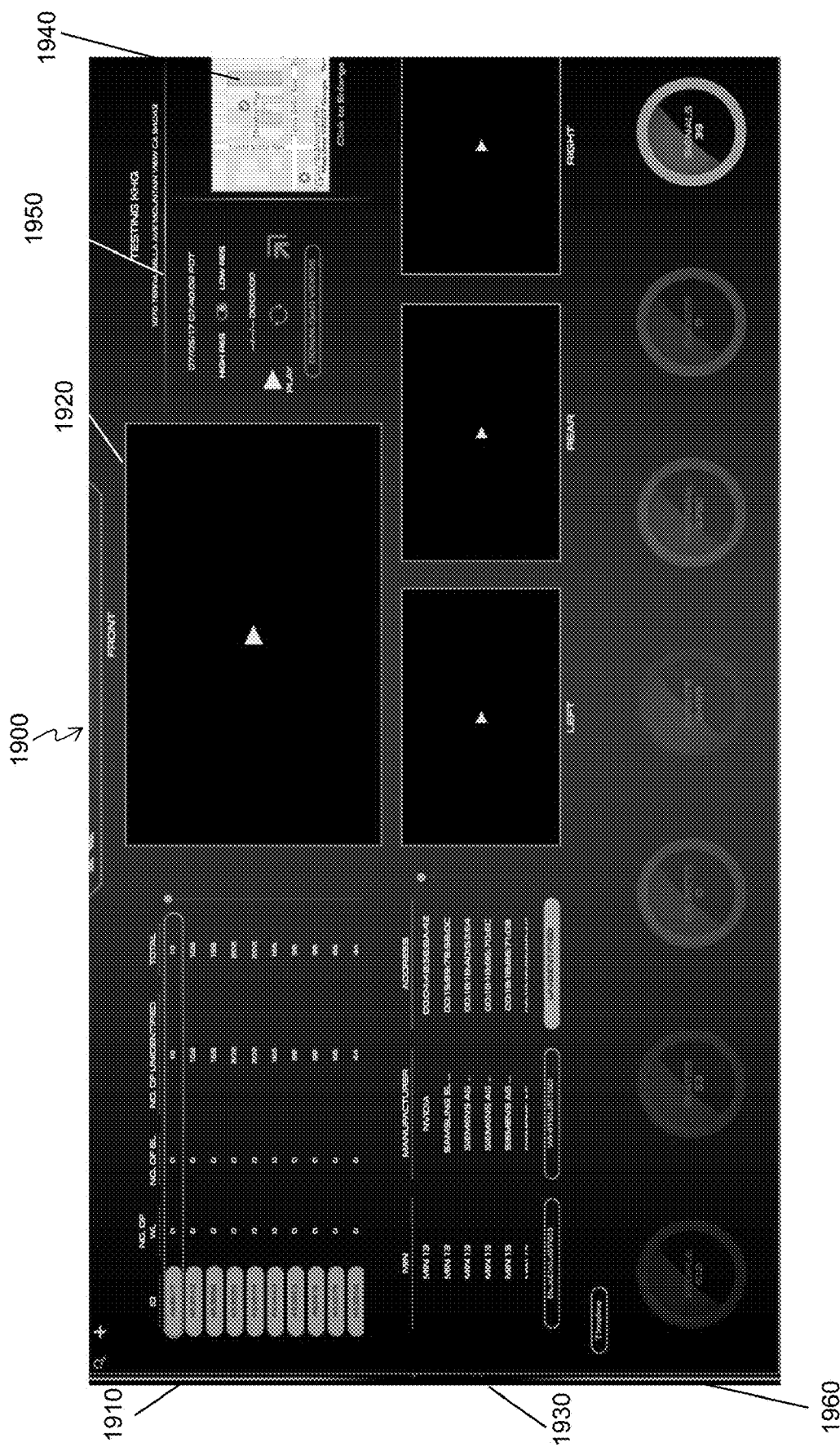
FIG. 19 illustrates a user interface showing wireless signals captured by one or more autonomous data machines, in accordance with embodiments.

FIG. 19 illustrates a user interface showing wireless signals 1900 captured by one or more autonomous data machines, in accordance with embodiments. Wireless signals may include wireless signals emitted by one or more objects, or provided in communications with one or more objects. Examples of objects whose wireless signals may be detected may include mobile phones, tablets, laptops, personal digital assistants, smart watching or other wearable items, or any other device capable of wireless communication. Wireless signals may include signals over a telecommunications network (e.g., 3G, 4G, LTE, etc.), WiFi signals, Bluetooth signals, or other types of signals.

The wireless signal information page may include a listing of wireless signal detections 1910. The listing of wireless signal detections may have any characteristic as described elsewhere herein for events. For instance, the listing of wireless signal detections may include an id of a wireless signal detection, a description of the wireless description (e.g., type of wireless signal), and/or a date/time at which a badge detection occurred. In some instances, the listing of wireless signal detections may include an id of wireless signal detection, number of white-listed wireless signals, number of blacklisted wireless signals, number of identified wireless signals, and/or total wireless signals. The listing may provide the number of wireless signals for the various categories at different points in time. In some instances, there may be a unit of time (e.g., week, day, multiple hours, hour, half hour, minute, second) during which the number of wireless signals is tabulated.

A user may select a wireless signal detection from a listing of wireless signal detections to view details about the wireless signal detection (e.g., over a period of time). When a user has selected a wireless signal event, data from an autonomous data machine related to the event may be displayed. In some instances, the data from the event may comprise image or video data 1920 from the autonomous data machine at the time of the wireless signal event. The data from the event may comprise image data during the time period of the event. The data may comprise image or video data from a single camera of the autonomous data machine. Alternatively, the data may comprise image or video data from multiple cameras of the autonomous data machine. Multiple images and/or video data may be displayed simultaneously. For example, data from a front camera, left camera, right camera, and/or rear camera may be displayed simultaneously. Optionally, one or more still images may be displayed. The still images may or may not be simultaneously displayed with the video data.

Details of the wireless signal event 1930 may be displayed. The details may relate to the selected wireless signal event. For instance, the details may include an identifier of the autonomous data machine that detected the wireless signal, a manufacturer of a wireless device that is emitting the wireless signal, and/or an address associated with the wireless device (e.g., IP address, mac address, any other type of identifier for the device). For instance, for a selected wireless signal event, there may be any number of wireless signals detected. The detected wireless signals may each be displayed in the details section. In some instances, the user may be able to view all categories of wireless signals (e.g., whitelisted, blacklisted, unidentified) together in the details section. In some instances the user may toggle between different categories (e.g., toggle between a blacklisted view, whitelisted view, and unidentified view).

The wireless signals page may or may not show a map 1940 of a site where the wireless signals detection is occurring. The map of the site may have any characteristics described for a map elsewhere herein. For instance, the map may show the autonomous data machine. The map may show a location where the wireless signal events provided in the listing have occurred. The map may optionally show the location of the autonomous data machine at a time at which a selected event has occurred.

Optionally, one or more controls 1950 may be provided. The one or more controls may affect the data about the event that is displayed. For instance, when image data of the event is provided, a user may be able to select between a high resolution image and a low resolution image. The use may pause playback of the image, resume playback, refresh, and/or enlarge/reduce the image. A user may also select an option to download videos and/or images. Any description herein of video may include an audio component to the video.

An option may be presented for a user to view a timeline. The user may be navigated to a timeline page. A timeline may have any characteristics as described elsewhere herein.

In some instances, a menu or navigation region 1960 may be provided. The navigation region may indicate to a user which page they are currently viewing. The navigation region may permit a user to navigate between different pages.

In some embodiments, the user interface may show visible and/or concealed weapons. Examples of weapons may include firearms, blades (e.g., knives), clubs, explosives, or any other type of weapon. Such weapons may be visible. The weapons may be seen by the naked eye. Such weapons may be out in the open. In some instances, such weapons may be partially or completely concealed. Concealed weapons may not be completely visible. In some instances, weapons may be concealed in clothing, containers, bags, vehicles, or other items, or concealed by individual's body parts.

The autonomous data machine may be capable of detecting information useful for identifying weapons (e.g., visible and/or concealed weapons). The autonomous data machine may analyze the information on-board, or the information may be analyzed off-board the autonomous data machine. In some embodiments, a control center may analyze information from the autonomous data machine to detect one or more weapons (e.g., visible and/or concealed weapons). In some instances, a stationary machine may be capable of detecting information useful for identifying weapons. The stationary machine may analyze the information on-board, or the information may be analyzed off-board the autonomous data machine. In some embodiments, a control center may analyze information from the stationary machine to detect one or more weapons. In some instances, a control center may receive information from both an autonomous data machine and a stationary machine.

A user interface may show data collected by the autonomous data machine and/or stationary machine. The user interface may show images captured by one or more sensors of the autonomous data machine and/or stationary machine. The images may be visible images, thermal images, images generated based on data captured by lidar, images based on data captured by ultrasonic sensors, images based on data captured by metal detectors, images based on data captured with aid of x-ray, images based on data captured with aid of radiation, or images based on data captured by any other type of sensors or emissions. The images may include a visual representation of the weapons (e.g., visible and/or concealed weapons). The visual representation may be an actual image of the weapon captured by one or more sensors (e.g., cameras, or other sensors). The visual representation may be a generated image representative of a detected weapon. For example, if a concealed knife is detected but not visible, a visual representation of the knife may be displayed at the estimated location of the knife.

An image of a weapon may be visually emphasized. In some embodiments, the image of the weapon may be highlighted, or have a box, circle or border around the image. The image of the weapon may be emphasized with color or any other visual indicator.

In some instances, information about a detected weapon may be displayed on a user interface. The information about a detected weapon may be displayed an image showing the detected weapon or a visual representation of the detected weapon. The information may include an identifier for the autonomous data machine that detected the weapon, a location or zone at which the weapon was detected, an indication of weapon type (e.g., firearm, explosive, blade, etc.), time at which the weapon was detected, and/or whether the weapon is visible or concealed. Any other information about the weapon may be displayed. In some instances, information about an individual associated with the weapon may be displayed. For example, an identification of an individual carrying a weapon or closest to the weapon may be displayed. An identification of an individual that a vehicle carrying a weapon is registered to may be displayed. Information such as whether the weapon is registered and/or the identified individual has a permit to carry the weapon may be displayed. In some instances, when an unauthorized weapon is detected, an alert may be raised.

In some instances, weapons detected over time may be displayed in a list form or chart form. In some instances, the information about the weapons may be categorized according to risk level. For example, if a police officer is carrying a registered sidearm, the risk level may be low. If an unknown or unauthorized individual has a vehicle with explosives, the risk level may be high. The list may include visible markers such as red for high risk, yellow for moderate risk, or green for low risk. Similarly, the list may include a quantitative or qualitative indicator of the level of risk for the weapon detection.

A user may select an instance of a weapon detection from the list. Additional details about the weapons detection instance may be displayed. For example, an image including the image of the weapon or visual representation of the weapon from that instance may be displayed. The image may be a still image or a video image. The weapon may be visually emphasized as previously described. A user may be able to utilize video and/or audio playback features as described elsewhere herein to view instances of the weapon detection over time. Additional information about the selected weapon detection, as described elsewhere herein, may be displayed.

Figure 20:
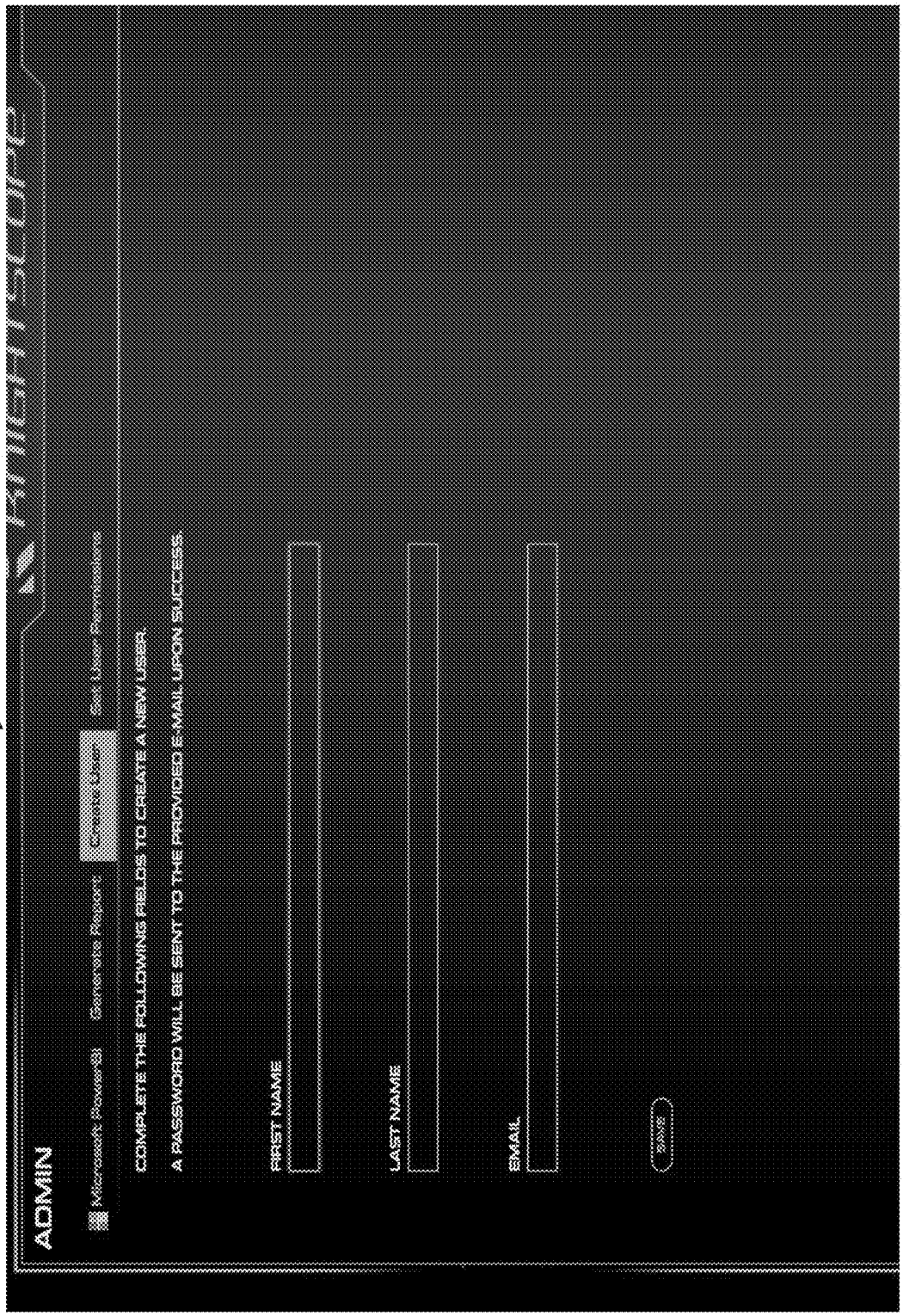
FIG. 20 illustrates a user interface showing an administrative page that permits creation of a new user, in accordance with embodiments.

FIG. 20 illustrates a user interface showing an administrative page 2000 that permits creation of a new user, in accordance with embodiments. A user may be able to view the user interfaces at a control center. The user may be an administrator at a control center. The user may or may not be associated with a party that owns and/or operates a site that is being patrolled by the autonomous data machines.

An option may be provided to create a user. A user may enter the user's name (e.g., first name, last name). The user may enter contact information, such as an email address, telephone number, or mailing address. A password may be provided to the contact information.

Options may also be provided to generate a report and/or set user permissions.

Figure 21:
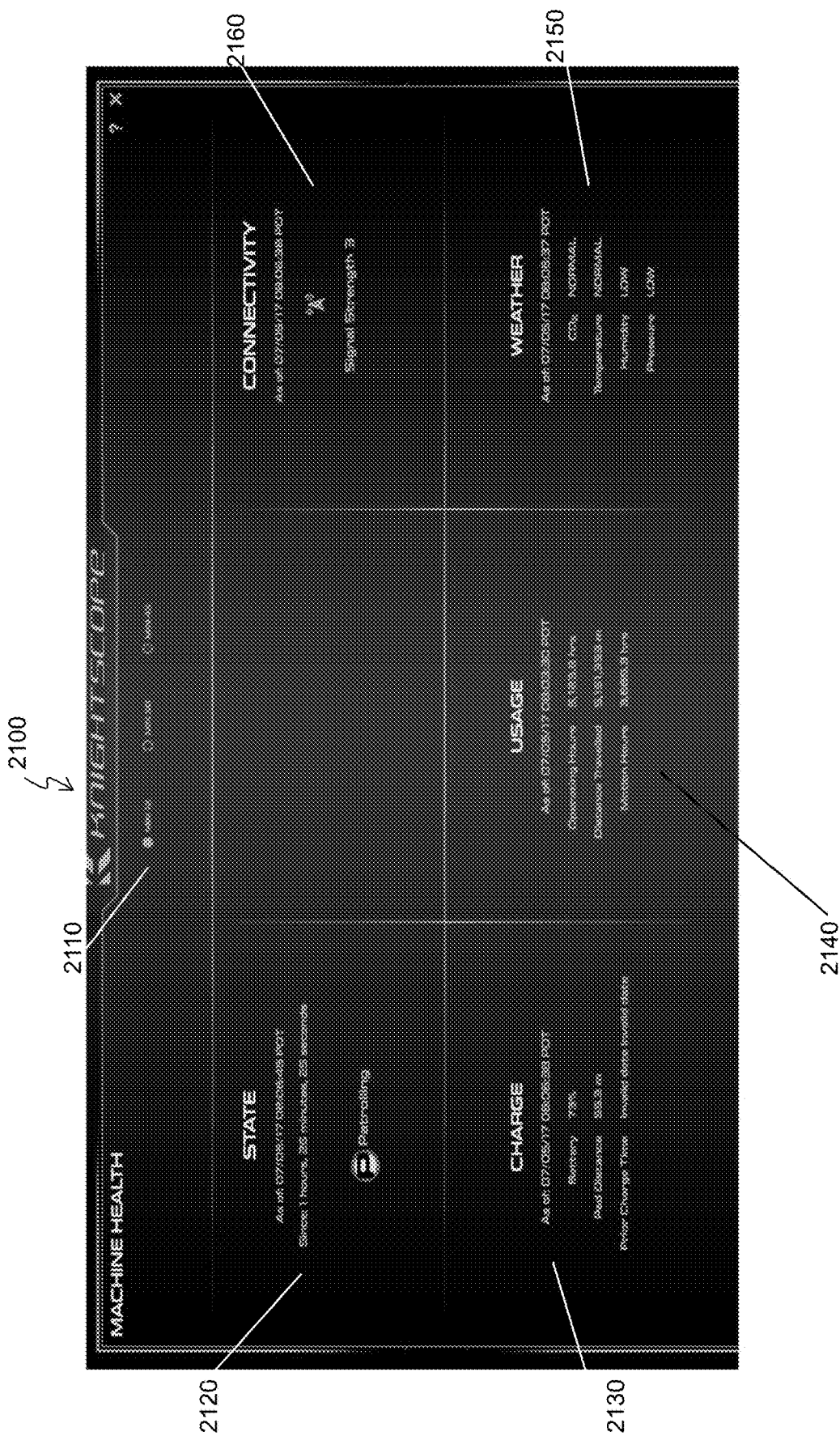
FIG. 21 illustrates an additional user interface for monitoring the status of one or more autonomous data machines, in accordance with embodiments.

FIG. 21 illustrates an additional user interface for monitoring the status of one or more autonomous data machines 2100, in accordance with embodiments. A user may be able to monitor machine health of one or more selected autonomous data machines. An identifier 2110 may be provided for the autonomous data machine associated with the machine health being displayed. A user may be able to toggle between different machines or select different machines to display the health.

A state section 2120 may show a state of the autonomous data machine. The timing information for the machine health information may be provided. For instance, the state may be provided as of a particular date and/or time. The amount of time that has elapsed since that time may also be displayed. A statue of the machine may be provided (e.g., patrolling, recharging, off, etc.).

A charge section 2130 may show a state of charge of the autonomous data machine. The timing information for the machine health information may be provided. For instance, the state of charge may be provided as of a particular date and/or time. The amount of time that has elapsed may or may not be shown. The state of charge information may include a level of charge of a battery (e.g., percentage charge, amount of active time remaining), a distance to a nearest charging bad, and/or a prior charge time (e.g., when the autonomous data machine was most recently charged).

A usage section 2140 may show usage history of the autonomous data machine. The timing information for the machine health information may be provided. For instance the usage of the machine may be provided as of a particular date and/or time. Examples of usage information may include total number of operating hours, total distance traveled, and/or total motion hours (hours that the autonomous data machine has moved about).

A weather section 2150 may show environmental factors around the autonomous data machine. The timing information for the machine health information may be provided. For instance the weather around the machine may be provided as of a particular date and/or time. Examples of usage information may include carbon dioxide levels, temperature, humidity and/or pressure. Quantitative and/or qualitative values may be provided (e.g., numerical values, or categories such as normal, low, or high).

A connectivity section 2160 may show connectivity information for the autonomous data machine. The timing information for the machine health information may be provided. For instance the connectivity of the machine may be provided as of a particular date and/or time. Examples of connectivity may include connectivity type (e.g., wifi, cellular, etc.) and/or signal strength. In some instances, signal strength may be provided in a quantitative and/or qualitative fashion. For instance, the signal strength may be presented as a number level, or a category (e.g., high, medium, low).

Figure 22:
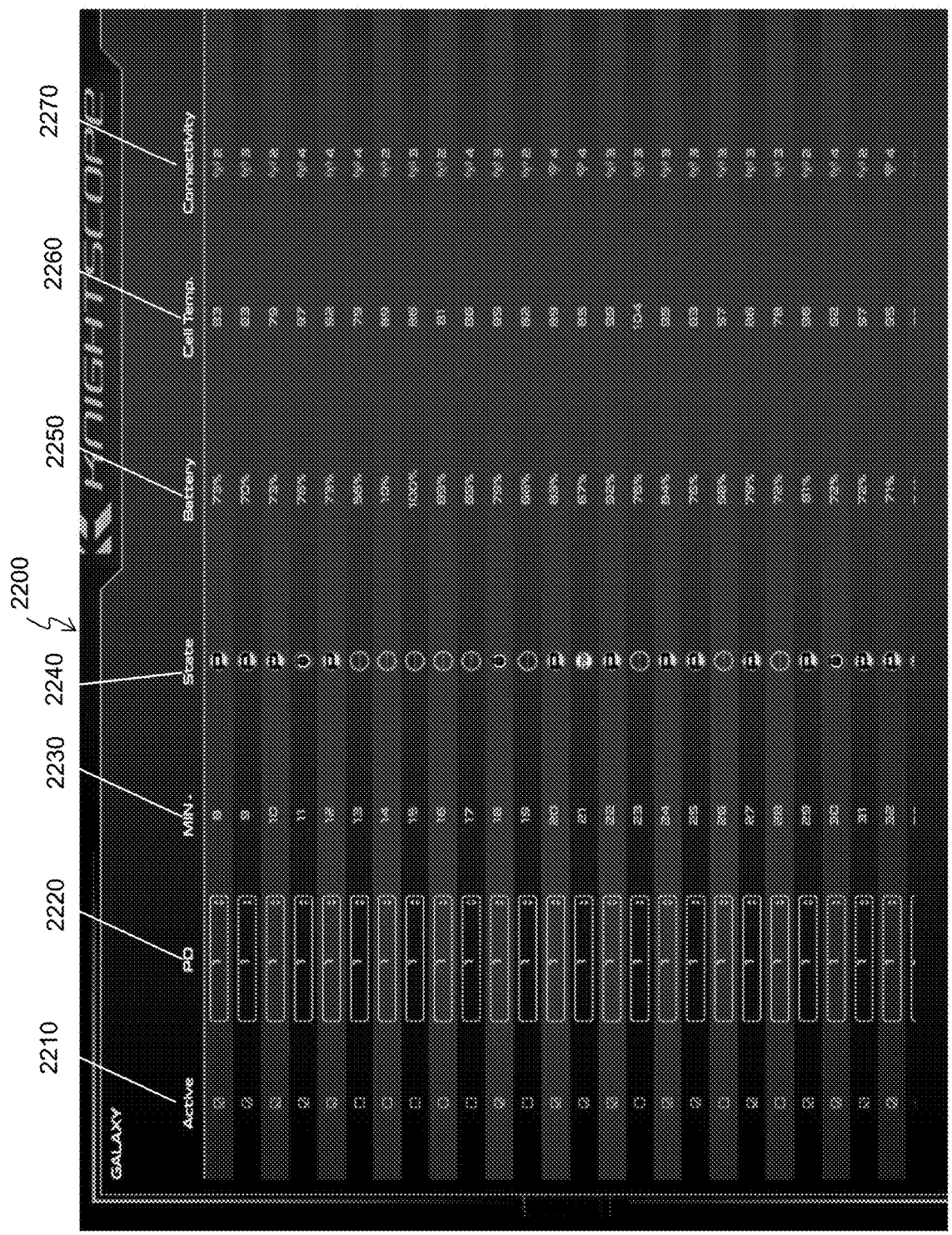
FIG. 22 illustrates a user interface showing a galaxy page, in accordance with embodiments.

FIG. 22 illustrates a user interface showing a galaxy page 2200, in accordance with embodiments. The galaxy page may show information about one or more autonomous data machines that may be located at one or more different sites. The galaxy page may show information about autonomous data machines that may be patrolling areas for different entities. The galaxy page may optionally be presented as a list view. Alternatively or additionally, the galaxy page may be presented as a chart, graphic, or any other type of visual display.

The galaxy page may include information about whether an autonomous data machine is active 2210. The information may optionally show pager duty (PD) values 2220. The galaxy page may optionally include an identifier for the autonomous data machine 2230. The identifier may be unique to the autonomous data machine. Status information 2240 may also be displayed. The status information may include whether an autonomous data machine is patrolling, charging, stopped, or powered off. Any other status may be provided, such as whether the machine is undergoing an error, or whether the machine senses an imminent threat. A power level 2250 may be displayed. The power level may include a battery state of charge (e.g., percentage of charge, estimated patrol time remaining, estimated distance to travel remaining). The galaxy page may also show a temperature of the autonomous data machine, such as cell temp 2260. The cell temp may be a temperature of a battery cell of the autonomous data machine. Connectivity data 2270 for the autonomous data machine may be displayed. The connectivity data may indicate whether the autonomous data machine is connected or not. The connectivity data may show the type of wireless connection (e.g., wifi, cellular, etc.). The connectivity may show the level of strength of the connection. Any of this information may be optional. Any combinations of this information may be displayed simultaneously.

Figure 23:
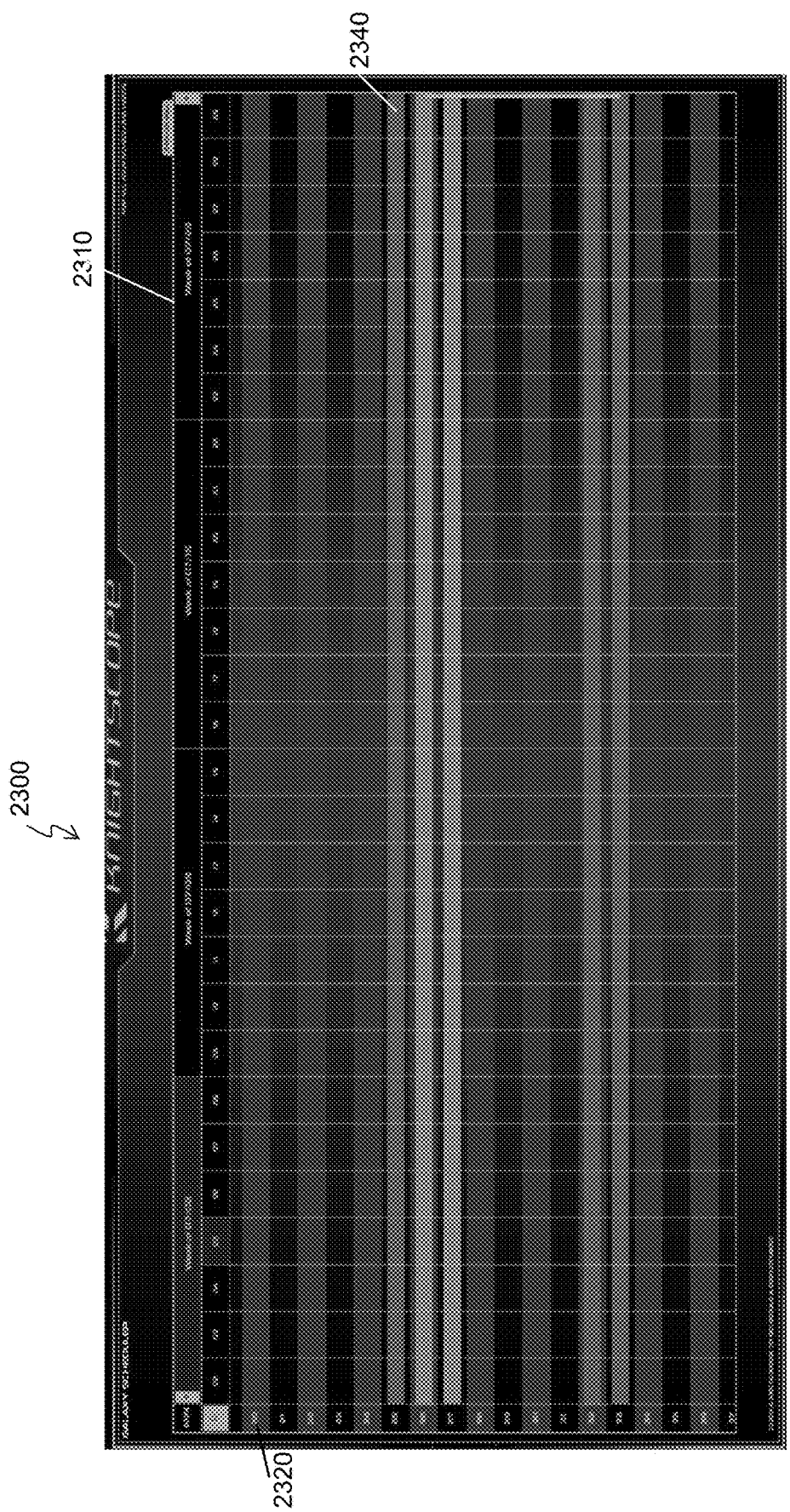
FIG. 23 illustrates a user interface showing a galaxy scheduler, in accordance with embodiments.

FIG. 23 illustrates a user interface showing a galaxy scheduler 2300, in accordance with embodiments. The galaxy scheduler may be displayed in a chart form or any other form. The galaxy scheduler may show up as a calendar with dates and/or times. Any demarcation of time 2310 (e.g., years, quarters, months, weeks, days, hours, minutes, seconds) may be used. A user may be able to adjust the demarcations of times displayed. In some embodiments, identifiers 2320 for the autonomous data machines may be displayed. The scheduler may show which autonomous data machines are scheduled to patrol or be operational during certain periods of time. In some instances, a bar 2340, or other visual representation may be used to show when the autonomous data machines are on duty. In some instances, the bars have different colors for different types of activities.

A user may be able to view a galaxy scheduler to see when the various autonomous data machines are scheduled to be active. A user may or may not view past times to see when the autonomous data machines were active. A user may optionally be able to interact with the scheduler to specify the schedule for individual autonomous data machines. The user may be able to edit existing schedules.

In some embodiments, a user may be able to schedule the patrolling of one or more autonomous data machines by time and/or location. In some instances, a user may be able to pre-specify a path that an autonomous data machine is to take at a location. The user may be able to specify the exact location of the path. The user may specify one or more paths. The user may specify which path the autonomous data machine may take at a specified time. In some instances, a user may be able to specify that an autonomous data machine may take a random path. The random path may occur within a set of one or more parameters set by a user. For instance, the user may specify that the autonomous data machine may take a random path within a particular zone or area. The user may specify that the autonomous data machine take a random path at certain times, while taking a pre-set path at other times. In some instances, the user may specify that the autonomous data machine take a random path at randomized times. The user may specify the amount of time the autonomous data machine may take a random path. For instance, the user may specify the autonomous data machine take a random path for 4 hours of the day, but the time at which the autonomous data machine takes the random path may be random.

The user may interact with any type of interface to determine a path for the autonomous data machine. For instance, the user may view a map of a location that the autonomous data machine is to patrol. The user may optionally draw a path for the autonomous data machine to take. In some instances, the user may specify coordinates for the autonomous data machine to traverse. In some instances, one or more waypoints may be provided for the autonomous data machine to reach. The path between the waypoints may be direct, or may be randomized. The autonomous data machine may deviate from a path to avoid obstacles. The autonomous data machine may deviate from a path to investigate one or more events of interest. The autonomous data machine may deviate from a path to interact with one or more individuals.

A user may schedule patrols of the autonomous data machines such that one or more data machines may traverse various zones at different times. For example, a first autonomous data machine may be scheduled to traverse a first zone from 6 AM to noon, and a second zone from noon to midnight, and a third zone from midnight to 6 AM. A second autonomous data machine may be scheduled to traverse a fourth zone from 6 AM to 9 AM, and the second zone from 9 AM to 3 PM, and a fifth zone from 3 PM to 6 AM. The various zones may be located at the same site. Alternatively different zones may be located at different sites. The autonomous data machines may be able to travel from one zone to another autonomously.

The various techniques described herein may be partially or fully implemented using code that is storable upon storage media and computer readable media, and executable by one or more processors of a computer system. Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, solid state drives (SSD) or other solid state storage devices, or any other medium which can be used to store the desired information and which can be accessed by the a system device. Based on the disclosure and teachings provided herein, a person of ordinary skill in the art will appreciate other ways and/or methods to implement the various embodiments.

As used herein A and/or B encompasses one or more of A or B, and combinations thereof such as A and B.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A method for collecting badge information using a self-propelled robotic autonomous data machine, the method comprising:

receiving, at one or more processors, badge information from the self-propelled robotic autonomous data machine, wherein the badge information indicates whether an individual has a badge and when the individual has a badge, the badge information is identified from an image data captured using an image capturing device onboard the self-propelled robotic autonomous data machine, wherein the image data comprises an individual holding or wearing the badge, wherein when the individual does not have a badge, the autonomous data machine physically guides the individual to a location where badges are obtained; and generating, with aid of the one or more processors, instructions to display, on a user interface, identification information based on the received badge information, wherein the user interface displays a listing of badge information captured by the self-propelled robotic autonomous data machine at different points in time along with an option for a user to confirm whether a badge information selected from the listing is correct, wherein confirmation of the selected badge information is used to grant the individual access to a monitored area, wherein the one or more processors are situated at a location remote from the self-propelled robotic autonomous data machine.

2. The method of claim 1, further comprising: generating, with aid of the one or more processors, instructions to display, on the user interface, the image data captured by the self-propelled robotic autonomous data machine at a time at which the received badge information was collected by the self-propelled robotic autonomous data machine.

3. The method of claim 2, wherein the image data comprises multiple images captured by different image capture devices having different fields of view.

4. The method of claim 2, wherein a badge is selected by a user viewing the user interface, and the image data corresponds to the badge information for the selected badge.

5. The method of claim 1, wherein a badge is selected by a user viewing the user interface, and further details about an individual associated with the selected badge and a collection of the badge information from the individual associated with the selected badge are displayed on the user interface.

6. The method of claim 1, wherein the self-propelled robotic autonomous data machine comprises: (1) one or more propulsion units configured to transport the self-propelled robotic autonomous data machine autonomously within the monitored area, and (2) one or more sensors.

7. The method of claim 1, further comprising: generating, with aid of the one or more processors, instructions to display, on the user interface, a map showing a location at which the badge information was collected by the self-propelled robotic autonomous data machine.

8. The method of claim 5, wherein the user interface allows the user to review the image data and provide an input indicative of whether the selected badge is associated with the individual from the image data.

9. The method of claim 1, wherein the user interface allows a user to review the image data and provide an input to confirm whether a detection of the badge is correct.

10. The method of claim 1, further comprising displaying a visual enhancement for the badge within the user interface.

* * * * *